US011706699B2

(12) United States Patent
Changlani et al.

(10) Patent No.: US 11,706,699 B2
(45) Date of Patent: Jul. 18, 2023

(54) SYSTEM AND METHOD FOR OPTIMIZED LOAD BALANCING ON 6 GHZ RADIOS USING OUT-OF-BAND DISCOVERY IN A MIXED AP DEPLOYMENT

(71) Applicant: HEWLETT PACKARD ENTERPRISE DEVELOPMENT LP, Houston, TX (US)

(72) Inventors: Nitin A. Changlani, Santa Clara, CA (US); Deven Patel, Santa Clara, CA (US); Farhan Hasnain, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 85 days.

(21) Appl. No.: 17/239,382

(22) Filed: Apr. 23, 2021

(65) Prior Publication Data

US 2022/0345991 A1    Oct. 27, 2022

(51) Int. Cl.
*H04W 48/10* (2009.01)
*H04W 48/16* (2009.01)
*H04W 84/12* (2009.01)

(52) U.S. Cl.
CPC ......... *H04W 48/16* (2013.01); *H04W 48/10* (2013.01); *H04W 84/12* (2013.01)

(58) Field of Classification Search
CPC .................................................... H04W 48/10
See application file for complete search history.

(56) References Cited

U.S. PATENT DOCUMENTS

| | | | |
|---|---|---|---|
| 2015/0087301 A1* | 3/2015 | Choudhary | H04W 48/16 455/434 |
| 2015/0289125 A1* | 10/2015 | Van Phan | H04W 8/005 455/434 |
| 2016/0029298 A1* | 1/2016 | Bergström | H04W 48/08 455/434 |
| 2016/0183176 A1* | 6/2016 | Lee | H04L 67/1063 455/434 |
| 2016/0198329 A1* | 7/2016 | Lee | H04W 8/005 455/434 |
| 2017/0006459 A1* | 1/2017 | Lambert | H04W 4/025 455/434 |
| 2017/0245134 A1* | 8/2017 | Patil | H04W 8/005 |
| 2018/0027398 A1* | 1/2018 | Jung | H04L 67/51 455/434 |

(Continued)

OTHER PUBLICATIONS

"Comments to the Draft 6GHz KDB Guidance on Network Association" by Broadcom, dated Sep. 25, 2020 (Year: 2020).

*Primary Examiner* — Qutbuddin Ghulamali
(74) *Attorney, Agent, or Firm* — Sheppard Mullin Richter & Hampton LLP

(57) ABSTRACT

Systems and methods are provided by which all APs in a particular deployment can be used to assist in the out-of-band discovery of 6 GHz radios by client devices. That is, a series of iterative operations can be performed to: (I) determine the state of 6 GHz radios in a zone/deployment area; (II) identify what radios can be considered near-neighbors to non-6 GHz radios for purposes of advertising one or more of the 6 GHz radios; (Ill) rank neighboring 6 GHz radios for a given non-6 GHz radio based on certain radio metrics; and (IV) ultimately determine those 6 GHz radios that can be advertised by the given non-6 GHz radio.

20 Claims, 17 Drawing Sheets

(56) References Cited

U.S. PATENT DOCUMENTS

| | | |
|---|---|---|
| 2018/0184363 A1* | 6/2018 | Van Hamersveld .. H04W 48/20 |
| 2020/0221378 A1 | 7/2020 | Kneckt et al. |
| 2021/0058856 A1 | 2/2021 | Qi et al. |
| 2021/0227547 A1 | 7/2021 | Chitrakar et al. |

* cited by examiner

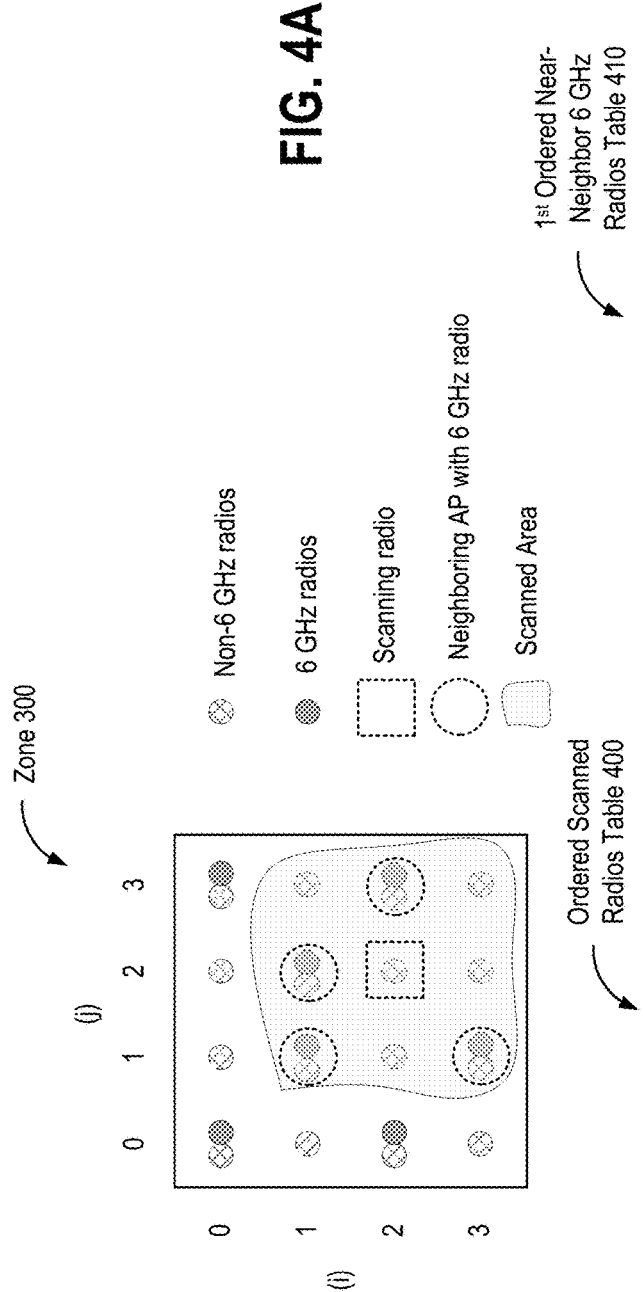

| 6 GHz radio MAC address | 6 GHz radio metrics | Collocated non-6 GHz radio MAC address | Scan results for non-6 GHz radio (ordered by RSSI and includes self) |
|---|---|---|---|
| R(0,0) | m1 | r(0,0) | r(0,0), r(0,1), r(1,0), r(1,1) |
| R(0,3) | m2 | r(0,3) | r(0,3), r(1,3) |
| R(1,1) | m3 | r(1,1) | r(1,1), r(1,0), r(1,2), r(0,0), r(0,1), r(1,3) |
| R(1,2) | m4 | r(1,2) | r(1,2), r(2,2), r(0,3), r(1,3) |
| R(2,0) | m5 | r(2,0) | r(2,0), r(2,1), r(2,2), r(1,3) |
| R(2,3) | m6 | r(2,3) | r(2,3), r(3,2), r(1,3) |
| R(3,1) | m7 | r(3,1) | r(3,0), r(3,2) |

Updated Superset Table 600

FIG. 6A

| Scanned Radio | Scanning Radio (ordered by RSSI and includes self) |
|---|---|
| r(0,0) | Some order of r(i,j) from "Scan results for non-6 GHz radio" (FIG. 6B) |
| r(0,1) | Some order of r(i,j) from "Scan results for non-6 GHz radio" (FIG. 6B) |
| r(1,0) | Some order of r(i,j) from "Scan results for non-6 GHz radio" (FIG. 6B) |
| r(1,1) | Some order of r(i,j) from "Scan results for non-6 GHz radio" (FIG. 6B) |
| r(0,3) | Some order of r(i,j) from "Scan results for non-6 GHz radio" (FIG. 6B) |
| r(0,2) | Some order of r(i,j) from "Scan results for non-6 GHz radio" (FIG. 6B) |
| r(1,2) | Some order of r(i,j) from "Scan results for non-6 GHz radio" (FIG. 6B) |
| r(1,3) | Some order of r(i,j) from "Scan results for non-6 GHz radio" (FIG. 6B) |
| r(2,2) | r(1,2), r(2,3), r(2,0), r(1,1), r(3,1) |
| r(2,1) | Some order of r(i,j) from "Scan results for non-6 GHz radio" (FIG. 6B) |
| r(2,0) | Some order of r(i,j) from "Scan results for non-6 GHz radio" (FIG. 6B) |
| r(2,3) | Some order of r(i,j) from "Scan results for non-6 GHz radio" (FIG. 6B) |

Intermediate Complementary List 610

FIG. 6B

2nd Ordered Near-Neighbor
6 GHz Radios Table 700

| Near-neighbor 6 GHz radios to r(2,2) obtained from Fig (5-a) (ordered by RSSI) | 6 GHz radio metrics |
|---|---|
| R(1,2) | m4 |
| R(2,3) | m6 |
| R(2,0) | m5 |
| R(1,1) | m3 |
| R(3,1) | m7 |

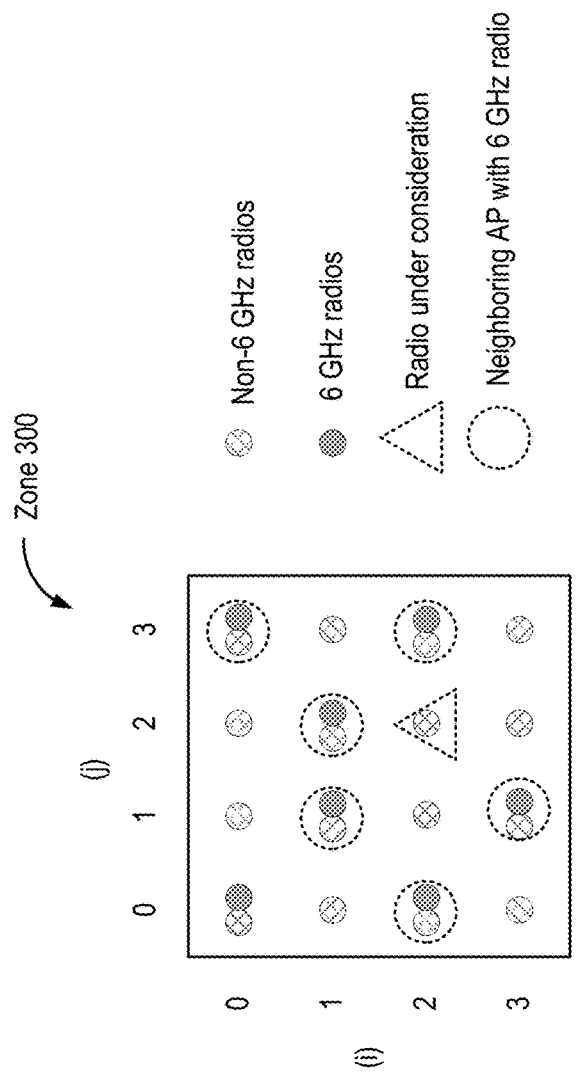
FIG. 9A
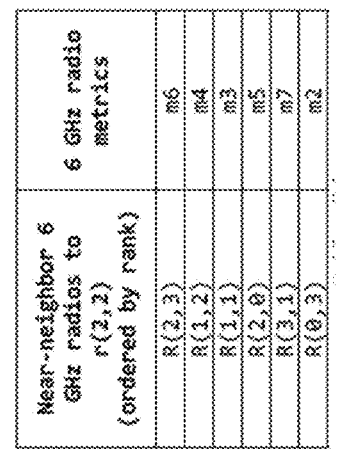
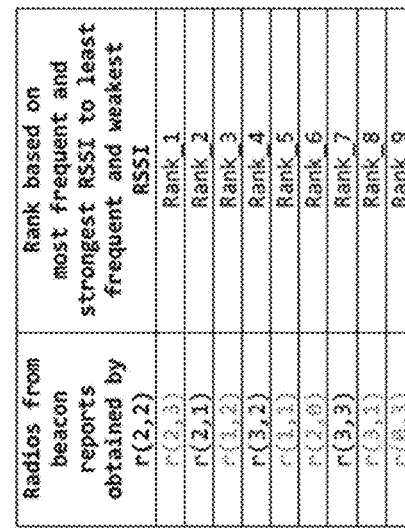
FIG. 9B

COMPUTING COMPONENT 1400

HARDWARE PROCESSOR 1402

MACHINE-READABLE STORAGE MEDIUM 1404

RECEIVE, AT A NON-6 GHZ RADIO IN A ZONE, COLLATED 6 GHZ RADIO METRICS BROADCAST FROM A CONTROLLER, THE RADIO METRICS BEING COLLECTED BY EACH 6 GHZ RADIO IN THE ZONE
1406

IDENTIFY NEIGHBORING 6 GHZ RADIOS FOR EACH OF THE NON-6GHZ RADIOS IN THE ZONE IN ACCORDANCE WITH EACH OF A PLURALITY OF NEAR-NEIGHBOR OPTIMIZATION MECHANISMS
1408

COMBINE ORDERED LISTS OF NEAR-NEIGHBOR 6 GHZ RADIOS FOR THE NON-6 GHZ RADIO, THE NON-6 GHZ RADIO COMPRISING AN INDEX RADIO
1410

DETERMINE A 6 GHZ RADIO THAT CAN BE ADVERTISED BY THE NON-6 GHZ RADIO
1412

FIG. 14

SYSTEM AND METHOD FOR OPTIMIZED LOAD BALANCING ON 6 GHZ RADIOS USING OUT-OF-BAND DISCOVERY IN A MIXED AP DEPLOYMENT

DESCRIPTION OF RELATED ART

Wireless digital networks are becoming ubiquitous in enterprises, providing secure and cost-effective access to resources. Those networks usually have one or more controllers, each controller supporting a plurality of access points (APs) deployed through the enterprise. Wi-Fi networks operating in accordance with IEEE 802.11 standards are examples of such networks. Wireless network communications devices (also referred to as stations or client devices), such as personal computers and mobile phones transmit data across wireless digital networks vis-à-vis Wi-Fi APs, and cellular network APs, for example.

Wireless local area network (WLAN) infrastructure elements or components in a Wi-Fi network provide service to WLAN devices. The Federal Communications Commission (FCC) recently approved the usage of approximately 1200 MHz of an unlicensed portion of the radio spectrum in the 6 GHz band for WLAN operations.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 4A illustrates an example RF zone scanning scenario.

FIG. 4B illustrates an example intersection determination to generate a first ordered near-neighbor 6 GHz radios list.

FIG. 6A illustrates an example updated data superset of the example collocated 6 GHz radio data superset of FIG. 3B.

FIG. 6B illustrates an example complementary, i.e., intermediate scanned-scanning radios, list.

FIG. 9A illustrates an example of client devices (connected to a radio of interest) scanning radios in an RF zone relative to a radio of interest.

FIG. 9B illustrates an example of generating a third ordered near-neighbor 6 GHz radios list.

FIG. 14 is an example computing component that may be used to determining a 6 GHz radio that can be advertised in an RNR IE of a given non-6 GHz radio.

Figure 1:
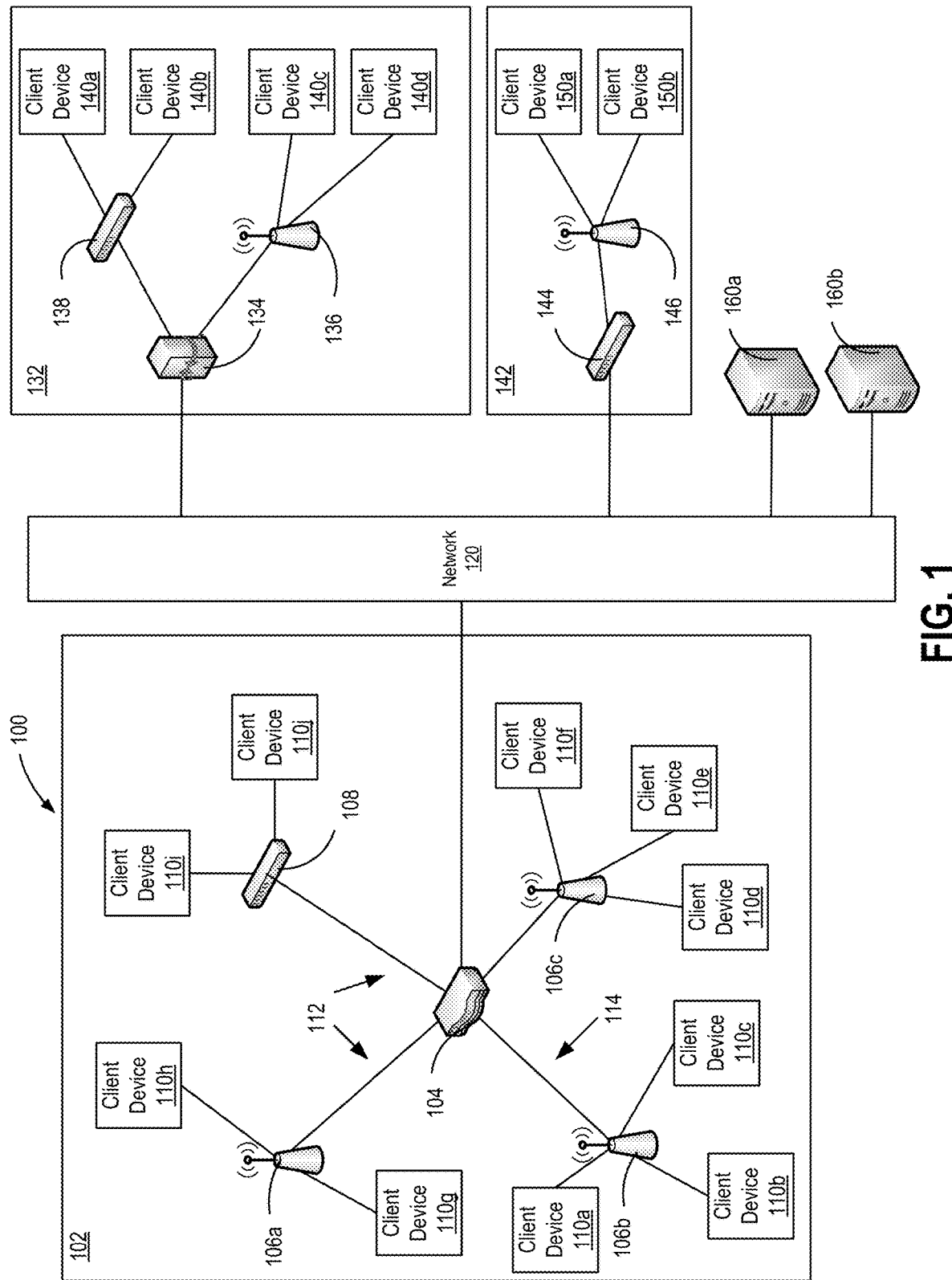
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

The FCC has approved the usage of about 1200 MHz of unlicensed spectrum in the 6 GHz band for WLAN operations. This effectively provides access to 59 new channels, each of the new channels having a bandwidth of 20 MHz. The new 59 channels can also be used as 29 channels, each having a bandwidth of 40 MHz, 14 channels, each having a bandwidth of 80 MHz, or 7 channels, each having a bandwidth of 160 MHz. To aid client devices in scanning these channels, the IEEE 802.11ax standard allows for an out-of-band discovery mechanism using an AP which has both 6 GHz and non-6 GHz (e.g., 2.4 GHz or 5 GHz) radios, referred to as collocated radios. That is, an AP can use a non-6 GHz radio to advertise the availability of a collocated 6 GHz radio to such client devices.

In particular, this advertising of a collocated 6 GHz radios by a non-6 GHz radio can be performed by allowing an AP to advertise a Reduced Neighborhood Report Information Element (RNR IE) in its beacons, as well as probe responses (to the RNR IE-populated beacons) on the non-6 GHz radio. Client devices that are capable of operating in the 6 GHz band can parse this RNR IE, and switch directly to the 6 GHz channel being advertised in the RNR IE, and connect directly to the corresponding service set ID(s) (SSID(s)) of the radio operating on that channel instead of spending time scanning the 6 GHz channels. This is intended to save client devices from experiencing an expectedly high scanning duration due to the number of channels present in the band, e.g., client devices scanning each and every 6 GHz channel one-by-one.

In a deployment with multiple APs, the above-described out-of-band discovery mechanism could theoretically work well if all the APs in a particular deployment had both 6 GHz radios and non-6 GHz radios. However, such a deployment is unrealistic. That is, typical deployments of APs include pre-existing or legacy/lower-end APs that may only have 2.4 GHz and/or 5 GHz radios. Because such legacy APs do not include a collocated 6 GHz radio, they will not be able to advertise a 6 GHz radio, and thus will not provide assistance to client devices when it comes to identifying available radios operating on 6 GHz channels.

Fortunately, the 802.11ax standard does not necessarily limit the scope of radios that can be considered to be collocated. Accordingly, the "looseness" or flexibility with which the 802.11ax standard considers radios to be collocated can be leveraged to maximize the advertising of 6 GHz channel (radios) availability by way of non-6 GHz channels (radios), where the non-6 GHz radios may be on the same AP (collocated, e.g., on the same printed circuit board (PCB)), or may simply be nearby (e.g., a near neighbor radio that is not on the same AP).

In accordance with various embodiments, systems and methods are provided by which all APs in a particular deployment can be used to assist in the out-of-band discovery of 6 GHz radios by client devices. That is, a series of iterative operations can be performed to: (I) determine the state of 6 GHz radios in a zone/deployment area; (II) identify what radios can be considered near-neighbors to non-6 GHz radios for purposes of advertising one or more of the 6 GHz radios; (Ill) rank neighboring 6 GHz radios for a given non-6 GHz radio based on certain radio metrics; and (IV) ultimately determine those 6 GHz radios that can be advertised by the given non-6 GHz radio.

Moreover, systems and methods are provided for dynamically modifying the set of advertised 6 GHz radios (in the RNR IE on non-6 GHz channels) in order to ensure that a balanced load can be achieved for each of the advertised 6 GHz radios. The load-balancing can be accomplished by advertising a desired 6 GHz radio to client devices while they are still scanning in the non-6 GHz channel. This will aid in reducing the operational cost of load-balancing client devices between 6 GHz radios at a later point in time using pre-exiting techniques because such methods may involve disassociating clients which would lead to them scanning the band. Moreover, the basic service set (BSS) may incur/experience delayed connections due to the higher scanning time.

As alluded to above, certain APs can be configured to operate according to different modes, e.g., single-radio or multi-radio modes. It should be understood that in single-radio mode, a single radio operates on a given band, whereas in a multi-radio mode, such as a dual-radio mode, the radio chains of a radio can be grouped while operating on a given band. That is, an AP may be configured to operate using logical or physical radios such that an AP can operate in single-radio mode where a single radio can utilize a given channel bandwidth allocation, e.g., 80 MHz, or in dual-radio mode where the single radio can be split into two radios, each utilizing the same or reduced or higher channel bandwidth allocation. As noted above, recently developed APs may comprise multi-band radios that can operate with radio chains in the 5 GHz band or 2.4 GHz band, as well as in the 6 GHz band.

As used herein, the term "radio chain" can refer to hardware that can transmit and/or receive information via radio signals. Wireless client devices and/or other wireless devices can communicate with a network device on a communication channel using multiple radio chains. As used herein, the term "communication channel" (or channel) can refer to a frequency or frequency range utilized by a network device to communicate (e.g., transmit and/or receive) information. A radio chain can include two antennas such as a horizontal antenna and a vertical antenna, among other possibilities. As used herein, the term "antenna" refers to a device that converts electric power into radio waves, and/or vice versa.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106*a-c*. Switches 108 and wireless APs 106*a-c* provide network connectivity to various client devices 110*a-j*. Using a connection to a switch 108 or AP 106*a-c*, a client device 110*a-j* may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network 120 may be a public or private network, such as the Internet, or other communication network to allow connectivity among the various sites 102, 132 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities.

Figure 2A:
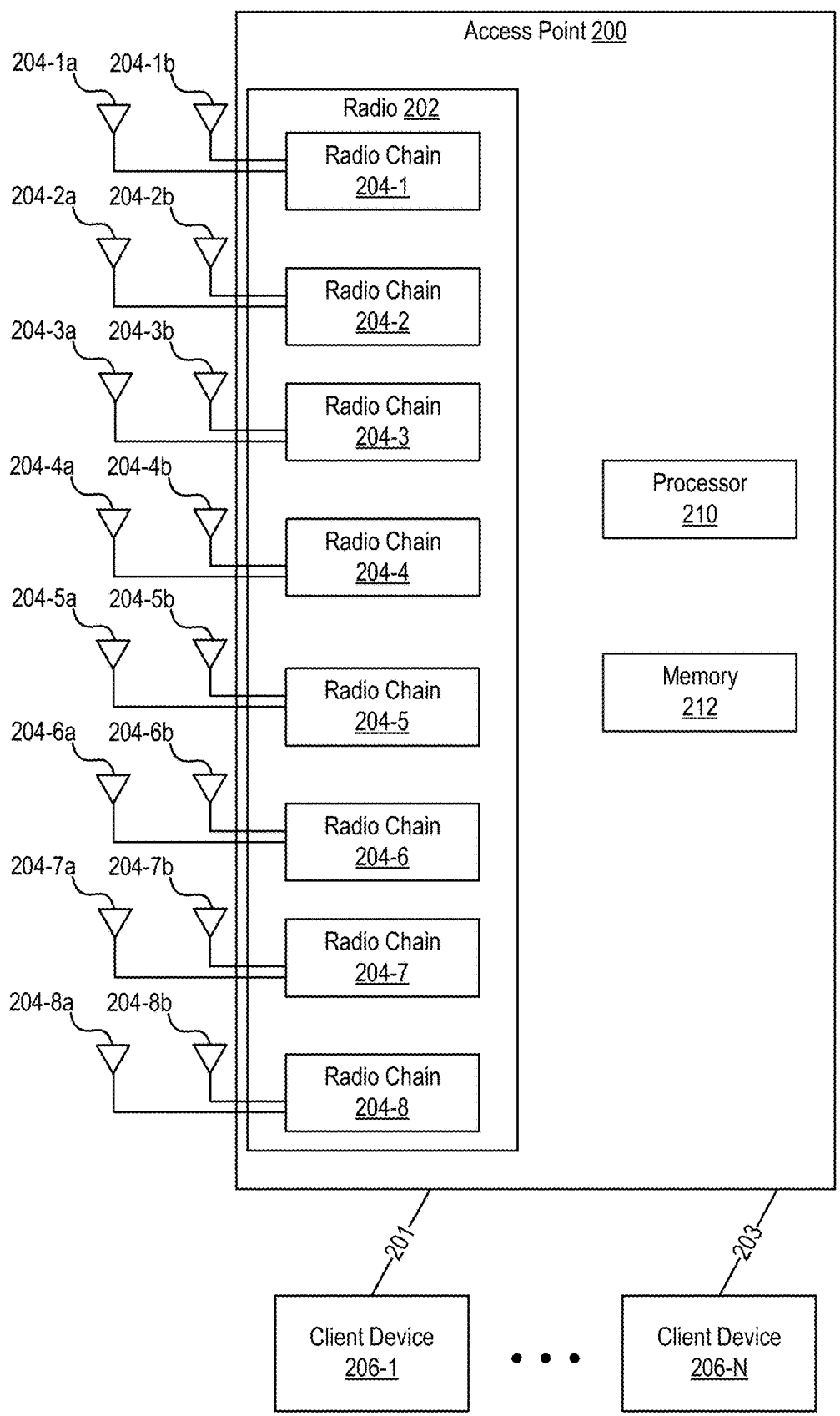
FIG. 2A illustrates an example access point within which various embodiments may be implemented.

FIG. 2A illustrates an example AP 200, which may be an embodiment of one of the APs of FIG. 1 (e.g., APs 106a-c). An AP can refer to a networking device that allows a wireless client device to connect to a wired or wireless network, and need not necessarily be limited to IEEE 802.11-based APs. An AP can include a processing resource, e.g., processor 210, a memory, e.g., memory 212, and/or input/output interfaces (not shown), including wired network interfaces such as IEEE 802.3 Ethernet interfaces, as well as wireless network interfaces such as IEEE 802.11 Wi-Fi interfaces, although examples of the disclosure are not limited to such interfaces.

Figure 2B:
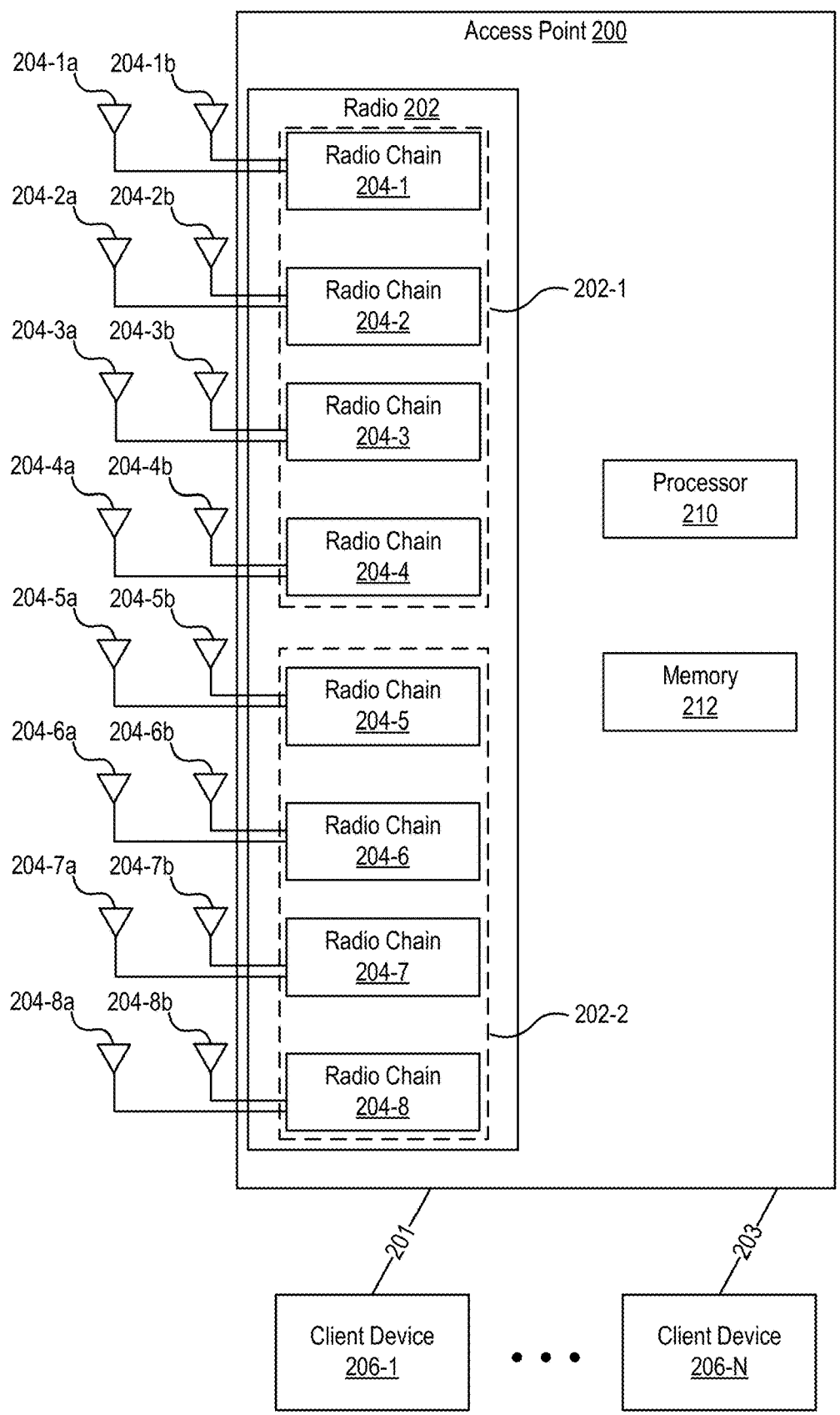
FIG. 2B illustrates a multi-radio configuration of the example access point of FIG. 2A.

AP 200 can include a radio 202 which may be a 5 GHz radio including eight radio chains, 204-1, 204-2, 204-3, 204-4 . . . , 204-8. Each radio chain may include two antennas (204-1a, 204-1b. 204-2a, 204-2b, 204-3a, 204-3b, 204-4a, 204-4b . . . , 204-8a, 204-8b). For instance, each radio chain can include a horizontal antenna and a vertical antenna, among other possibilities. Each radio chain is available for both transmitting and receiving data. It should be understood that examples of the present disclosure are not so limited. Although not shown in FIG. 2A for clarity and so as not to obscure examples of the present disclosure, each of the radio chains can be connected to the plurality of antennas via a RF switch. As illustrated in FIG. 2B, AP 200 can be configured to operate using two (dual-radio mode) or more radios. For example, radio 202-1 can be dedicated to a first communication channel 201 in the 5 GHz band, while radio 202-2 can be dedicated to a second communication channel 203 in the 6 GHz band. In other examples, radio 202-1 can be dedicated, again to communications in the 5 GHz band, while radio 202-2 can be dedicated to communications in the 2.4. GHz band.

It should be understood that while in some embodiments, the non-6 GHz radio can be either a 2.4 GHz radio or a 5 GHz radio, an AP can also comprise another 6 GHz radio that is operating on a primary scanning channel (PSC), and can assist the clients in discovering other 6 GHz radios in an applicable zone/neighborhood. That is, information regarding collocated 6 GHz radios can be carried in the RNR IE of a collocated non-6 GHz radio or collocated 6 GHz radio. It should also be noted that client devices can limit their scanning of 6 GHz channels to PSC channels from which insight into what is available on the non-PSC channel can be derived. As another example, an AP may only include a 6 GHz radio. In such a scenario, the physically nearest non-6 GHz radio (e.g., a 2.4 GHz radio or a 5 GHz radio or a 6 GHz radio operating on PSC channel) can be assigned as its collocated radio, and the mechanisms described herein can be used for that 6 GHz radio's out-of-band discovery and load balancing.

Traditionally, in any radio frequency (RF) zone of a deployment (that is, a zone in which multiple APs that may be able to detect each other have been installed or implemented), the APs are connected at the back-end, to a controller device that can aggregate the states of different APs and provide inputs to those different APs. In accordance with some embodiments, a deployment can refer to or can be defined as some plurality of basic service set IDs (BSSIDs) (which corresponds to cell size) across a given geographical area, e.g., office building, warehouse, etc. An RF zone or simply zone can refer to a deployment subset comprising a plurality of APs that can hear, interfere with, and/or listen to each other. For example, a deployment may comprise a plurality of BSSIDs spread throughout a building having three stories, while a zone of the deployment may comprise one floor of the three stories.

Figures 3A, 3B:
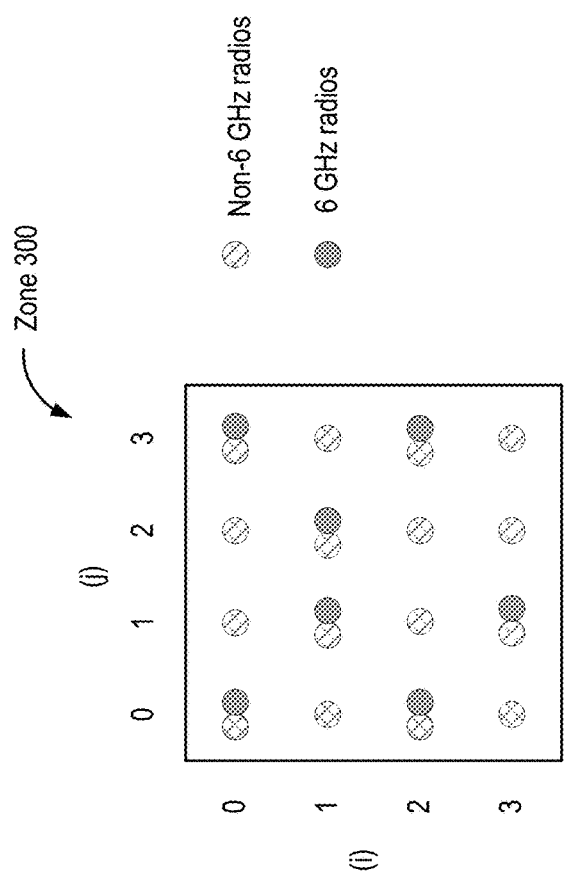
FIG. 3A illustrates an example mixed AP deployment RF zone.
FIG. 3B illustrates an example collocated 6 GHz radio data superset.

FIG. 3A illustrates an example of such a zone 300 comprising a mixed deployment of APs with each AP(i,j) having 6 GHz and/or non-6 GHz radios. For ease of reference, 6 GHz radios in AP(i,j) will be referred to as R(i,j), and non-6 GHz radios in an AP can be referred to as r(i,j).

As illustrated in FIG. 3A, zone 300 may include, for example, 16 APs, each having at least one non-6 GHz radio (e.g., a 5 GHz or 2.4 GHz radio). Some of the 16 APs making up the deployment of zone 300 may be multi-radio APs that also comprise a 6 GHz radio. In the example of FIG. 3A, AP (0,0), AP (0,3), AP (1,1), AP (1,2), AP (2,0), AP (2,3), AP (3,1) each include a non-6 GHz radio as well as a 6 GHz radio. In contrast, AP (0,1), AP (0,2), AP (1,0), AP (1,3), AP (2,1), AP (2,2), AP (3,0), AP (3,2), AP (3,3) may have at least one non-6 GHz radio, and no 6 GHz radios.

As alluded to above, various embodiments are directed to advertising 6 GHz channel availability via non-6 GHz radios that are either physically collocated on an AP or, physically separate, but in a neighboring AP. As per the example mixed deployment zone 300, multiple operations may be effectuated across every 6 GHz and non-6 GHz radio in the APs of zone 300, and a controller device to which the APs controlling these radios are connected. In some embodiments, such a controller device may be an AP controller, such as controller 104 (FIG. 1). Again, the state of all the APs with 6 GHz radios in zone 300 can be shared with APs deployed in zone 300 having non-6 GHz radios (that may or may not also have a 6 GHz radio).

It should be understood that the various operations, methods, processes, procedures, etc. described herein are generally performed by a processing or computing component(s) of an AP in which one or more radios are implemented, as well as by a controller, such as an AP controller. Operations that may be described herein as occurring or being performed by a radio should be understood as being performed by the AP on which that particular radio is implemented or an AP controller associated with the AP.

I. Collating the State of 6 GHz Radios in a Zone

As noted above, various embodiments comprise mechanisms for allowing both—APs with collocated radios (APs having both 6 GHz and non-6 GHz radios, as well as APs having, e.g., multiple 6 GHz radios), and those with either just non-6 GHz radio(s) or a single 6 GHz radio (non-collocated radios) to advertise 6 GHz channel availability by treating physically non-collocated radios as logically collocated radios, when possible. In some embodiments, an initial operation that will ultimately lead to the advertisement of 6 GHz radios by non-6 GHz radios can include defining a metric describing the state of a given 6 GHz radio in a zone. That metric provides a way by which radios can be compared against one another, i.e., the metric can be used to qualify and compare the 6 GHz radio against another 6 GHz radio. This metric can be calculated by the 6 GHz radio across all its BSSs. In some embodiments, the metric (also referred to as a radio metric) may be a set of values that can, together, be used to determine which of the 6 GHz radios should be advertised in an RNR IE of one or more non-6 GHz radios in the zone, such as zone 300.

In some embodiments, the aforementioned radio metric can be a value reflecting the number of active clients associated to a 6 GHz radio. It should be noted that in some embodiments, for load balancing purposes, this metric can be used as a basis for assigning an advertisement preference or priority. That is, in some embodiments, a 6 GHz radio having, e.g., a lower/lowest number of clients (relative to other 6 GHz radios in the zone) can be afforded a higher advertisement priority, meaning a less-utilized 6 GHz channel will be advertised via beaconed RNR IE originating from a non-6 GHz radio(s). For balancing active traffic across 6 GHz radios, in some embodiments, the total number of bytes transmitted and/or received over a given amount of time, may also be used as a condition or characteristic upon which load balancing can be based. Accordingly, the radio metric associated with a 6 GHz radio can be either of these characteristics or a combination of these characteristics. In some embodiments, still other characteristics, conditions, features, etc. may form the basis or part of the basis on which load balancing can be performed across radios in a deployment, such as zone 300. Indeed most any characteristic, feature, condition, etc. that may be optimized in a given RF zone can make up, at least in part, the aforementioned radio metric.

At periodic intervals of time, each 6 GHz radio in a zone may share this radio metric information to a controller associated with the AP(s) to which each of the 6 GHz radios belongs. It should be understood that this sharing of radio metric information (as is the case with other operations, e.g., updating information, channel scanning, etc. described herein) need not be limited to regular, periodic intervals. Rather, sharing, updating of information, scanning, etc. can also occur at random time intervals, or even as a single-occurrence operation, or otherwise, aperiodically. The controller may then collate or aggregate the respective radio metric information from all the relevant APs in the zone. As will be described in greater detail below, collating of such information can be accomplished by way of AP reporting to, e.g., an AP controller, or by an AP controller polling for such information from its connected APs. As mentioned above, this receipt/collating of information can occur periodically or aperiodically. In some embodiments, the radio metric information regarding those 6 GHz radios can be used to generate a list, table, or other aggregated data set indicating at least: (a) the 6 GHz radios in the zone, e.g., zone 300, identified by their respective media access control (MAC) address; (b) corresponding 6 GHz radio metrics information; and (c) all the (physically) collocated non-6 GHz radios corresponding to the identified 6 GHz radios (again identified by MAC address).

It should be noted that this aggregate listing of 6 GHz radios, 6 GHz radio metrics information, and corresponding collocated non-6 GHz radios need not necessarily be ordered in any way. In some embodiments, this aggregate list comprises a superset of all the 6 GHz radios present in a zone that can be broadcast to all the non-6 GHz radios (collocated as well as non-collocated) in the zone. Such non-6 GHz radios can use this superset to further determine which of the identified 6 GHz radios should be advertised in the RNR IE of a non-6 GHz radio beacon for out-of-band discovery. In some embodiments, this information can be updated periodically by all 6 GHz radios and as a result, the broadcasted summary or superset from the controller is also updated.

FIG. 3B illustrates an example superset table 310 summarizing the 6 GHz radios in zone 300, the corresponding radio metrics of those 6 GHz radios, and corresponding collocated non-6 GHz radios. For example, and as described above, zone 300 (FIG. 3A) comprises a mixed AP deployment where the following APs comprise at least a 6 GHz radio: AP (0,0); AP (0,3); AP (1,1); AP (1,2); AP (2,0); AP (2,3); AP (3,1). As reflected in superset table 310, the following 6 GHz radios are identified: R (0,0); R (0,3); R (1,1); R (1,2); R (2,0); R (2,3); R (3,1). As alluded to above, and reflected in superset table 310, radios may be identified via their respective MAC addresses. It should be understood that the nomenclature used in the present disclosure (row/column) is for ease of reference.

As described above, each of the identified 6 GHz radios can have associated radio metrics information relevant to that 6 GHz radio, e.g., number of active client devices associated to the AP and communicating/using the 6 GHz channel provided by the 6 GHz radio, throughput (e.g., number of bytes transmitted and/or received over a given time period), or other characteristic(s)/condition(s), or some combination thereof. Those 6 GHz radio metrics are represented in superset table 310 as the following: m1, m2, m3, . . . m7. It should be understood that the "mX" labeling convention is merely for example/ease of reference purposes. Superset table 310 may have a 6 GHz radio metrics field that comprises actual values, numerical information, or other data indicative of or reflecting the aforementioned radio metrics.

As also noted above, superset table 310 may indicate or reflect those non-6 GHz radios collocated with each respective 6 GHz radio. In the example illustrated in FIG. 3B, superset table 310 reflects that: R (0,0) is physically collocated with r (0,0); R (0,3) is physically collocated with r (0,3); R (1,1) is physically collocated with r (1,1); R (1,2) is physically collocated with r (1,2); R (2,0) is physically collocated with r (2,0); R (2,3) is physically collocated with r (2,3); and R (3,1) is physically collocated with r (3,1). It should be understood that zone 300 and superset table 310 are examples, and not meant to limiting. As noted above, a mixed AP deployment may have APs comprising two 6 GHz radios, a single 6 GHz radio only, etc., and superset table 310 would reflect such scenarios. It should be understood that in situations where an AP may have two 6 GHz radios or a single 6 GHz radio, a collocated non-6 GHz radio with which a 6 GHz radio is associated may be designated to be a physically nearest non-6 GHz radio (logical collocation). For example the physically nearest 5 GHz radio can be assigned, and embodiments disclosed herein can be applied in such situations with respect to out-of-band discovery or load balancing. It should be noted that when a 6 GHz radio, e.g., reports its own radio metrics to a controller, e.g., corresponding AP controller, an identifier (e.g., MAC address) of its collocated non-6 GHz radio can also be reported as well/at the same time.

II. Identifying the Neighboring 6 GHz Radios for Each of the Non-6 GHz Radios in the Zone As noted above, a summary of all the 6 GHz radios (that are implemented as part of one or more APs) in a zone of a mixed AP deployment, along with their corresponding radio metrics information, and their associated collocated non-6 GHz radio can be provided to a controller, which can then disseminate the summary (superset table 310) to each non-6 GHz radio in the zone. Once every non-6 GHz radio in the zone obtains or is provided with a copy of superset table 310, a subset of the 6 GHz radios that are "near-neighbors" of (closest to) a given non-6 GHz radio can be determined.

Referring back to FIG. 3A, consider for example zone 300, and the non-6 GHz radio for AP (3,2), i.e., r (3,2). Although zone 300 includes an AP (0,0) that has a non-6 GHz radio r (0,0) and a 6 GHz radio R (0,0), it should be understood that advertising R (0,0) in the RNR IE transmitted with a beacon from r (3,2) may not be valuable to client devices. This is because the distance between AP (3,2)/r (3,2) to which a client device may be associated or to which the client device listens, may be prohibitively far such that the client device (close to AP (3,2)) may not be able to effectuate a connection to AP (0,0). However, AP (3,2)/r (3,2) may be able to make a determination regarding advertising the 6 GHz radios from AP(3,1) or AP(2,3), i.e., R (3,1) or R (2,3).

Thus, in accordance with some embodiments, every AP having a non-6 GHz radio in a zone, e.g., zone 300, may identify which of the 6 GHz radios present in zone 300 can be considered to be near-neighbors so that the non-6 GHz radios can include near-neighbor 6 GHz radios in the subset of 6 GHz radios that can be considered for advertising in the non-6 GHz radio's RNR IE.

Again, in accordance with various embodiments, determinations regarding which 6 GHZ radio in a zone (whether collocated with a given non-6 GHz radio or not) should be advertised by the non-6 GHz radio channel(s) of an AP in a zone are made. It should be understood that although various embodiments disclose systems and methods of optimizing advertising as well as load balancing across radios/APs, various embodiments may still result in a 6 GHz radio being advertised by more than one non-6 GHz radio in its zone. Recall that per the 802.11ax standard, the only non-6 GHz radios that advertise 6 GHz radio channels are those non-6 GHz radios that are collocated with the 6 GHz radio whose channel it can advertise. In contrast, various embodiments enable non-6 GHz radios to advertise 6 GHz radios regardless of whether a particular non-6 GHz radio is physically collocated with the advertised 6 GHz radio, so long as it may be considered to be a near-neighbor of the 6 GHz radio. This optimization can be performed in accordance with a plurality of approaches using non-6 GHz radios collocated with 6 GHz radios as a "reference point." That is, the same subset of 6 GHz radios can be optimized from four perspectives: (i) identifying non-6 GHz radios collocated with 6 GHz radios that the given non-6 GHz radio can consider a near-neighbor (in other words, identifying all APs/radios in an RF zone that a given AP/radio can hear); (ii) identifying non-6 GHz radios collocated with 6 GHz radios that can consider the given non-6 GHz radio as a near-neighbor (in other words, identifying what APs/radios can hear the given AP/radio); (iii) identifying non-6 GHz radios collocated with 6 GHz radios that the client devices of the given non-6 GHz radio can consider as a near-neighbor (in other words, identifying what APs/radios can the client devices of the given AP/radio hear); and (iv) identifying the non-6 GHz radios collocated with 6 GHz radios that can consider the client devices of the given non-6 GHz radio as a near-neighbor (in other words, identifying what APs/radios can hear the client devices of the given AP/radio). It should be noted that the terms "hear" or "listen" in this context may mean being able to receive frames like probe responses, probe requests, and any other frames used for scanning or discovery with sufficient signal strength (as described in accordance with various embodiments).

It should be understood that this four-pronged approach is used because the wireless links between any two devices (between a client device and AP/radio, between APs/radios) are asymmetric. Thus, every wireless link from every direction/perspective can be considered, thereby providing better optimization in terms of selecting or determining which 6 GHz radio channels to advertise from which non-6 GHz radio. Moreover, the wireless links between different devices may have different characteristics, and thus again, taking into account all these different characteristics allows selecting which 6 GHz radio channels to advertise from which non-6 GHz radio (any and every non-6 GHz radio) to be optimized to the fullest extent.

i. Identifying the Non-6 GHz Radios Collocated with 6 GHz Radios that the Given Non-6 GHz Radio can Consider a Near-Neighbor In accordance with a first of the aforementioned perspectives, all non-6 GHz radios that are collocated with a 6 GHz radio, and whose transmissions can be decoded by a given non-6 GHz radio in the zone are identified. This approach allows a given non-6 GHz radio to identify near-neighbor non-6 GHz radios with collocated 6 GHz radios in the zone that can be assumed or approximated as being "close enough," for the distance to the given non-6 GHz radio, i.e., such that their signal strength is considered sufficiently strong to allow a client device to connect.

In some embodiments, the periodic scans that every AP performs on its own radios in order to discover the neighboring APs and client devices can be leveraged. That is, every given non-6 GHz radio in a zone can listen for beacons, probe responses and any proprietary frames intended for scanning and discovery (e.g., over-the-air (OTA) frames) (transmitted by other radios) to identify neighbor APs. This information can be used to create a list of the neighboring radios ordered by signal strength (i.e., received signal strength information (RSSI)). An intersection of these scan results against the superset table 310 can identify the non-6 GHz radios—and thereby also their collocated 6 GHz radios—that are near-neighbors for the given non-6 GHz radio.

To account for a special case where the scanning non-6 GHz radio is collocated with a 6 GHz radio, the scanning non-6 GHz radio can be included as one of the scanned radios in a list of scanned radios as well, so that it may also be included in the aforementioned intersection between the superset table 310 and this scanned radios list. This ensures that the scanning non-6 GHz radio considers its physically collocated 6 GHz radio as part of its near-neighbors.

Referring now to FIGS. 4A and 4B, FIG. 4A illustrates an example scanning scenario in zone 300, while FIG. 4B illustrates an example scanned radios list (or table) 400, that can be an ordered list/table, that after determining the intersection with superset table 310, results in a first ordered near-neighbor 6 GHz radios list or table 410. This first ordered near-neighbor 6 GHz radios table 410 provides a list of the ordered near-neighbor 6 GHz radios in accordance with perceived closeness by/to the given scanning non-6 GHz radio.

In particular, radio r (2,2) may perform a periodic scan of BSSs near to it, after which radio r (2,2) can group the BSSs on a radio-basis. As illustrated in FIG. 4A, the scanning area encompasses the following APs: AP (1,1); AP (2,1); AP (3,1); AP (1,2); AP (2,2); AP (3,2); AP (1,3); AP (2,3); and AP (3,3). It should be understood that the scanning area may reflect what an AP/radios of an AP can hear. As a result of the scanning by AP (2,2) from the perspective of radio r (2,2), the scanned radios table 400 can be generated, and following this example, results in the inclusion of the following non-6 GHz radios: r (1,1); r (2,1); r (3,1); r (1,2); r (2,2); r (3,2); r (1,3); r (2,3); and r (3,3). This list of non-6 GHz radios that results from a periodic scan performed by radio r (2,2) can be ordered based on RSSI, e.g., from strongest to weakest, recalling the radio r (2,2) is itself included in the list. The AP (2,2) can, from the perspective of a given non-6 GHz radio, i.e., radio r (2,2), determine the intersection of the scanned radios table 400 with the superset table 310 to identify those 6 GHz radios that can be considered to be near-neighbors of radio r (2,2). Of those scanned APs, four of the nine APs in the scanned area are APs that have non-6 GHz radios collocated with 6 GHz radios, i.e., radios R (1,2), R (2,3), R (1,1), R (3,1). This order of 6 GHz radios reflects the corresponding signal strength, i.e., from strongest to weakest RSSI. Moreover, the corresponding 6 GHz radio metrics can also be determined and reflected in the first ordered near-neighbor 6 GHz radios table 410.

Figure 5:
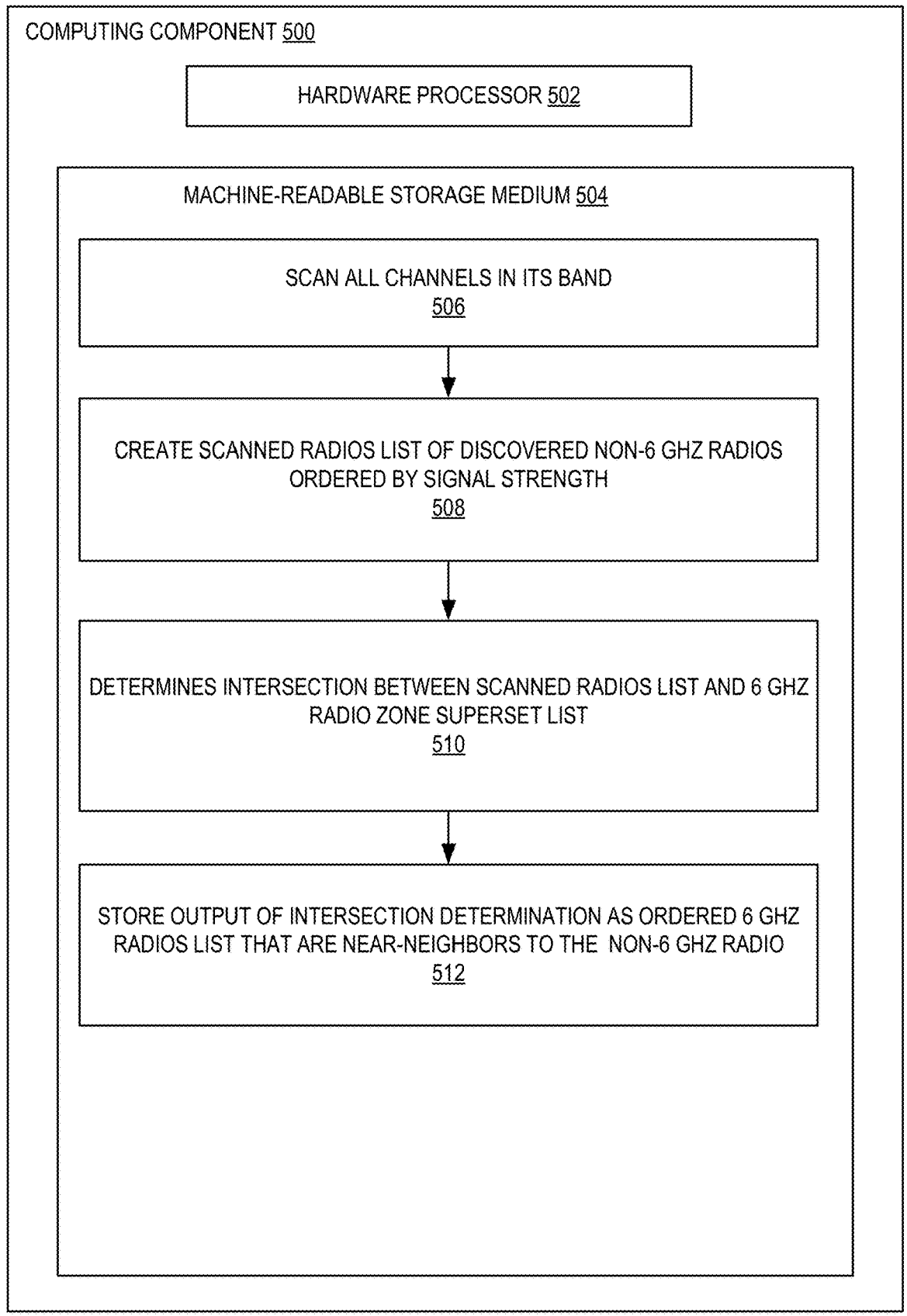
FIG. 5 is an example computing component that may be used to identify the non-6 GHz radios collocated with 6 GHz radios that the given non-6 GHz radio can consider a near-neighbor.

FIG. 5 is a block diagram of an example computing component or device 500, such as an AP processor or controller processing/computing component in accordance with one embodiment. Computing component 500 may be, for example, a computing component capable of processing data. In the example implementation of FIG. 5, the computing component 500 includes a hardware processor, 502, and machine-readable storage medium, 504. In some embodiments, computing component 500 may be an embodiment of AP processor 210 (FIG. 2B), a processor or computing component of a controller, such as controller 104 (FIG. 1), which may be a network controller, AP controller, etc.

Hardware processor 502 may be one or more central processing units (CPUs), semiconductor-based microprocessors, and/or other hardware devices suitable for retrieval and execution of instructions stored in machine-readable storage medium, 504. Hardware processor 502 may fetch, decode, and execute instructions, such as instructions 506-512. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-512.

Hardware processor 502 may execute instruction 506 to scan all channels its band. As noted above, each non-6 GHz radio (implemented in each AP) operating in an RF zone may perform channel scanning. An AP may perform scanning to allow an AP to tune the non-6 GHz radio (or any of its radios) to tune to a different channel, detect interference sources, rogue/ad-hoc Wi-Fi networks, other neighboring Wi-Fi networks, etc.

Hardware processor 502 may execute instruction 508 to, as a result of the scanning, create a scanned radios list of the discovered non-6 GHz radios ordered by signal strength, e.g., strongest to weakest RSSI. As noted above, the non-6 GHZ radio performing this scanning may be included in the scanned list (an embodiment of which is scanned radios table 400 (FIG. 4B)). This can be done for the case where the scanning non-6 GHz radio is collocated with a 6 GHz radio in an AP so that when an intersection between a superset 6 GHz radio list and the scanned radios list is determined (discussed below), any physically collocated 6 GHz radio will be considered to be a near-neighbor of the scanning non-6 GHz radio.

Hardware processor 502 may execute instruction 510 to determine the intersection between the scanned radios list and a 6 GHz radio zone superset list. In some embodiments, the superset list (embodied for example, as superset table 310 (FIG. 3B)) is a summary of all the 6 GHz radios present in a zone that can be broadcast to all the non-6 GHz radios (collocated as well as non-collocated with a 6 GHz radio) in the zone. Determining the intersection of radios (radios that are identified in both the superset list and the scanned radios list) allows the scanning non-6 GHz radios to ultimately determine which of the identified 6 GHz radios can be advertised in the RNR IE of a non-6 GHz radio beacon for out-of-band discovery.

Hardware processor 502 may execute instruction 512 to store an output of the intersection determination as an ordered 6 GHz radios list that are near-neighbors to the scanning non-6 GHz radio (embodied, for example, as first ordered near-neighbor 6 GHz radios table 410). Like the scanned radios list discussed above, this ordered list of near-neighbor 6 GHz radios can be ranked from strongest RSSI to weakest RSSI. At this point, a first subset of 6 GHz radios that a particular non-6 GHz radio may advertise vis-à-vis its beacons (in the RNR IE) is achieved, this first set being optimized from the perspective of identifying those non-6 GHz radios collocated with 6 GHz radios that the scanning non-6 GHz radio can consider a near-neighbor.

ii. Identifying the Non-6 GHz Radios Collocated with 6 GHz Radios that can Consider the Given Non-6 GHz Radio as a Near-Neighbor Identifying those non-6 GHz radios that are collocated with 6 GHz radios that can consider a given non-6 GHz radio, e.g., the scanning non-6 GHz radio discussed above in (i), to be a near-neighbor provides another optimization perspective that can be complementary to identifying the non-6 GHz radios collocated with 6 GHz radios that the scanning non-6 GHz radio can consider a near-neighbor. That is, instead of a given non-6 GHz radio scanning for non-6 GHz radios that are collocated with 6 GHz radios, radios that can scan a given radio are identified, which can be considered to be the inverse to the first near-neighbor determination described above. This allows a scanned non-6 GHz radio to be identified as a near-neighbor of the scanning AP's 6 GHz radio, and can be treated as being close enough for the distance to the scanning AP's 6 GHz radio, i.e., such that its signal strength is considered sufficiently strong to allow a client device to connect.

As described above, APs already perform periodic scans on their radios for neighborhood discovery. In accordance with some embodiments, this information can be derived from the non-6 GHz radios collocated with 6 GHz radios in an AP, and added to the radio metrics information that is being passed onto the controller, e.g., AP controller. The information can be appended to the superset list or table of 6 GHz radios in the zone, e.g., superset table 310 (FIG. 3B) by including the scanned results for each of the non-6 GHz radios with the radio metrics information provided to the controller by the 6 GHz radios in the zone. As before, these results are obtained by scanning the BSS and grouping them on a radio-basis. The result can be represented in an updated (of superset table 310) superset table 600 illustrated in FIG. 6.

Now, for a given non-6 GHz radio, the 6 GHz radios in the zone (making up the superset list, e.g., those radios listed in superset table 310) whose collocated non-6 GHz radios were able to scan the given non-6 GHz radio can be identified from updated superset table 600, and again, serves as complementary data to the superset list of 6 GHz radios. In some embodiments, as reflected in FIG. 6A, this addition of complementary data can be performed by reorganizing superset table 310 such that superset table 310 is indexed by each non-6 GHz radio in a scan results field or column. The updated superset table 600 can be ordered in terms of RSSI strength, and similar to the first ordered near-neighbor 6 GHz radios table 410, updated superset table 600 also includes the given non-6 GHz radio, i.e., radio r (2,2).

That is, and continuing with the above example using non-collocated non-6 GHz radio r (2,2) of AP (2,2) in zone 300, updated superset table 600 may include the 6 GHz radio superset, each 6 GHz radio's corresponding radio metrics information, an indication of each 6 GHz radio's collocated non-6 GHz radio, and the (appended) scan results obtained by scanning for the given non-6 GHz radio, in this case, radio r (2,2).

Figures 7A, 7B:
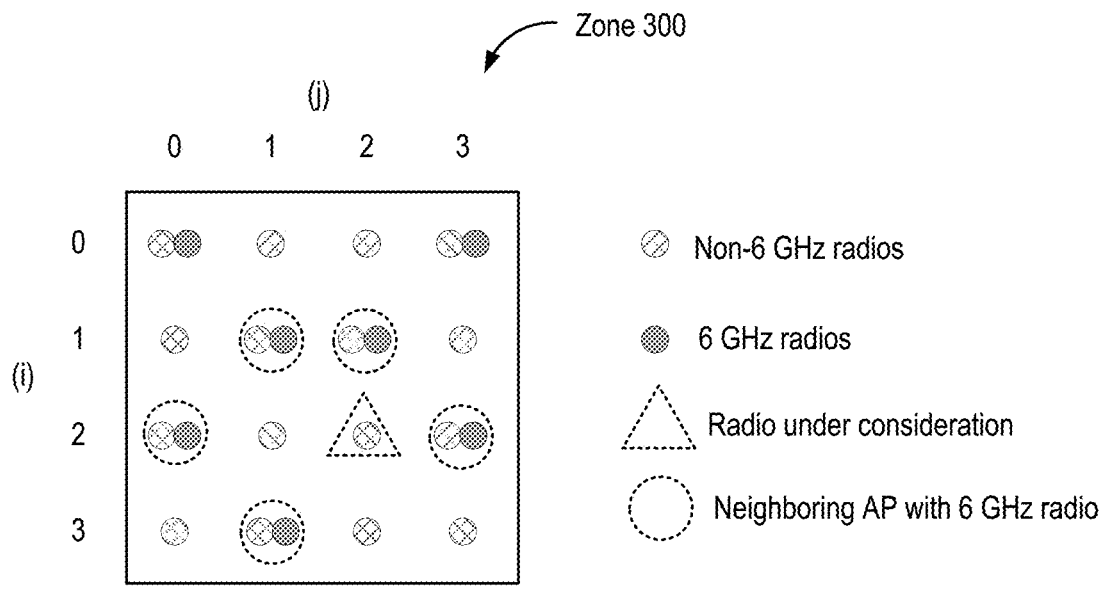
FIG. 7A illustrates an example scanning scenario from the perspective of nearby radios scanning a given radio under consideration.
FIG. 7B illustrates a second ordered near-neighbor 6 GHz radios list.

As illustrated in FIG. 7A, from the perspective of a non-6 GHz radio, e.g., r (2,2), being scanned by a non-6 GHz radio that is collocated with a 6 GHz radio, it is determined that five non-6 GHz radios collocated with a 6 GHz radio can scan the radio r (2,2). Thus, their collocated 6 GHz radios can be considered near-neighbors to the scanning radio r (2,2). As a result, and as reflected by second ordered near-neighbor 6 GHz radios table 700 illustrated in FIG. 7B, the near-neighbor 6 GHz radios relative to r (2,2), ordered based on RSSI with which their collocated non-6 GHz radios scanned r(2,2), is as follows: R (1,2); R (2,3); R (2,0); R (1,1); and R (3,1). In other words, the second ordered near-neighbor 6 GHz radios table 700 reflects those near-neighbor 6 GHz radios ordered in terms of perceived closeness by those APs that scanned the given non-6 GHz radio r(2,2).

Figure 8:
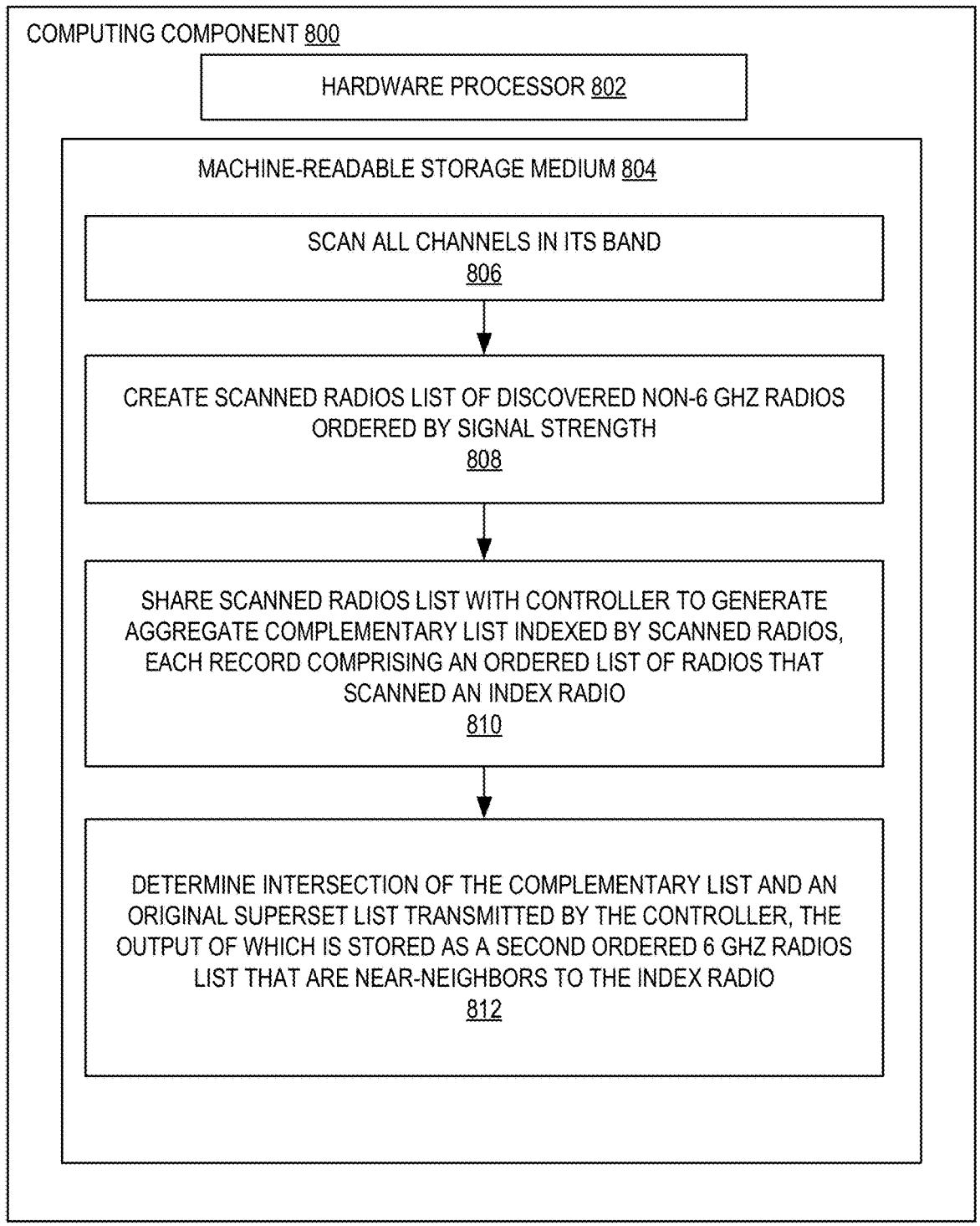
FIG. 8 is an example computing component that may be used to identify non-6 GHz radios collocated with 6 GHz radios that can consider a given non-6 GHz radio a near-neighbor.

FIG. 8 is a block diagram of an example computing component or device 800, such as a controller or an AP processor in accordance with one embodiment. Computing component 800 may be, for example, a computing component capable of processing data. In the example implementation of FIG. 8, the computing component 800 includes a hardware processor, 802, and machine-readable storage medium, 804, similar to computing component 500, hardware processor 502, and machine-readable storage medium 504. Machine-readable storage medium 804 may be encoded with executable instructions, for example, instructions 806-812. In some embodiments, computing component 800 may be an embodiment of processor 210 (FIG. 2B) or a computing component of controller 104 (FIG. 1).

Hardware processor 802 may execute instruction 806 to scan all channels in its band. Again, at this stage of optimization, each non-6 GHz radio that is collocated with a 6 GHz radio in the RF zone may perform this scanning for the purpose of determining what collocated non-6 GHz radios are able to detect a given non-6 GHz radio in the RF zone during their respective scans.

Hardware processor 802 may execute instruction 808 to create a scanned radios list of discovered non-6 GHz radios ordered by signal strength, i.e., RSSI.

Hardware processor 802 may execute instruction 810 to share the scanned radios list with the controller to generate a complementary list indexed by the scanned radios, each radio "record" making up the complementary list, comprising an ordered list of 6 GHz radios collocated with non-6 GHz radios that scanned an index radio. It should be understood that the index radio refers to that radio that each collocated non-6 GHz radio discovers during its respective scanning process. In other words, an index radio can be considered to a reference point or radio relative to which the scanning is performed. Referring to the example described above, the index radio is radio r (2,2). It should be understood that the scanning radio, i.e., each collocated non-6 GHz radio is itself included in the scanned radios list. It should also be understood that at the controller, each scanned radios list shared by a collocated non-6 GHz radio can be collated, such that the resulting complementary list is an aggregate complementary list that, again, is indexed by the "scanned radios," and ordered.

Referring back to FIG. 6A, for example, the collocated non-6 GHz radio r (0,0), upon performing its scan, detects the following radios: r (0,0); r (0,1); r (1,0); r (1,1). That is, from the perspective of radio r (0,0), each of these scanned radios are close enough to be considered neighboring radios/APs. Each collocated non-6 GHz radio, upon performing is periodic scan, results in scanned radios relative to that collocated non-6 GHz radio. However, from the perspective of a given non-6 GHz radio, the index radio, e.g., radio r (2,2), those collocated non-6 GHz radios that detect radio r (2,2) are only the following radios: r (1,1); r (1,2); r (2,0); 4 (2,3); and r (3,1).

Hardware processor 802 may execute instruction 812 to determine an intersection of the complementary list and the original superset list transmitted by the controller, the output of which is stored as a second ordered 6 GHz radios list reflecting those 6 GHz radios that are near neighbors to the index radio at each index radio. That is, and referring to FIG. 6B which illustrates an example complementary list (alluded to above) represents a converted indexing. From updated superset table 600, which maps scanning radio to list of scanned radios, a complementary list 610 can be derived from updated superset table 600 which maps a scanned radio to the radios that performed the scanning to detect the scanned radio. Considering the given non-6 GHz radio r(2,2), scanned by r(1,2), r(2,3), r(2,0), r(1,1), and r(3,1), the intersection between this tuple and superset table 310, will result in the second ordered near-neighbor 6 GHz radios table 700 (FIG. 7B).

iii. Identifying the Non-6 GHz Radios Collocated with 6 GHz Radios that the Client Devices of the Given Non-6 GHz Radio can Consider to be a Near-Neighbor The aforementioned optimizations can be performed to capture the perspectives of collocated non-6 GHz radios that a given non-6 GHz radio can consider near-neighbors, and those collocated non-6 GHz radios that can consider the given radio as a near-neighbor. In accordance with this optimization mechanism, those radios that can be scanned by the client devices of a given non-6 GHz radio can now be identified. This information can then be used to create a third ordered list of 6 GHz radios to which the client devices (or any new client device) may have a better chance of transitioning. It should be understood that this optimization mechanism can be considered as being similar to the optimization performed to capture those collocated non-6 GHz radios that a given-radio can consider near-neighbors ((i)), except that the scanned radios information may be derived from the client devices associated to the given non-6 GHz radio as opposed to the radio itself.

It should be understood that this scanning information from the client device perspective provides a client device's view of the RF zone, and can be useful in scenarios where the client devices for a given radio are not necessarily uniformly distributed. This scanning information can also be useful in scenarios where the client devices may additionally, or alternatively, favor certain neighboring radios more than other radios. It should be understood that a client device may favor a particular radio based on client device-side implemented preferences, but can also be a function of RSSI and/or path loss measurements/information. This allows a given non-6 GHz radio to identify those near-neighbor 6 GHz radios that may be preferable in terms of signal strength and path loss from the perspective of client devices operating on the given non-6 GHz radio.

Like APs, client devices may also perform periodic or non-periodic or singular-executed channel scans, and may also maintain a list of radios ordered by signal strength, e.g., RSSI, similar to ordered scanned radios table 400 (FIG. 4B). Client device scanning can be performed to determine a suitable AP to which the client device may roam (now or in the future). These client device scans can be performed at a client device by listening to beacons and probe responses (or any other frames that can be used for scanning and discovery) across the nearby channels at regular intervals. As previously described, a client device scan may be performed across all BSSs around the client device, but the results can be grouped on a per radio-basis.

In particular, a given non-6 GHz radio can request beacon reports from the client devices that are currently connected to the given non-6 GHz radio using standard or proprietary mechanisms (e.g., as set forth in the 802.11k standard). It should be understood that a beacon report can provide information about all the radios that a client device has scanned in its vicinity and those radios' respective signal strengths as seen/measured by the client device. From these beacon reports that the non 6-GHz radio obtains from all its associated client devices, the non-6 GHz radio can create a first aggregated list of neighboring non-6 GHz radios. This first aggregated list can be ordered by a metric that depends on the number of clients that report the non-6 GHz radio, and the non-6 GHz radio's corresponding RSSI measurement from those client devices. Similar to the aforementioned optimization processes, an AP can determine the intersection between this aggregated list, represented as aggregated table 900 (FIG. 9A) and superset table 310 (FIG. 3A). The determined intersection can be used to derive/results in a third near-neighbor 6 GHz ordered list or table 910. This third near-neighbor 6 GHz ordered table 910 can be a list of those near-neighbor 6 GHz radios ordered or ranked in accordance with client device-perceived closeness to the given non-6 GHz radio under consideration.

FIG. 9A illustrates an example of client device-based scanning in zone 300, again with radio r (2,2) being the given—radio (or radio under consideration). As illustrated in FIG. 9A, radio r (2,2) may be the non-collocated non-6 GHz index radio. As described above, radio r (2,2) may obtain beacon reports from one or more clients devices associated with radio r (2,2), i.e., connected to an AP on that particular radio. The client device beacon reports relay RSSI information from the perspective of each client device attached to the radio r (2,2). In this example, the beacon reports from the client devices associated with radio r (2,2) indicate that the client devices detect, by virtue of periodic scanning, the following non-6 GHz radios in zone 300: r (2,3); r (2,1); r (1,2); r (3,2); r (1,1); r (2,0); r (3,3); r (3,1); r (0,3).

FIG. 9B illustrates a first aggregated table 900 representative of the client device-detected non-6 GHZ in zone 300 ranked or ordered from most frequent and strongest associated RSSI to least frequent and weakest RSSI (in other words, per the client device-reported RSSI and the number of client devices reporting the particular non-6 GHz radio in respective beacon reports). Again, the given radio is in this case, radio r (2,2), and AP (2,2)/radio r (2,2) may determine the intersection between first aggregated table 900 and superset table 310. The intersection of these data sets results in a third ordered near-neighbor 6 GHz radios table 910 that reflects those 6 GHz radios in zone 300 that are considered to be near-neighbors to radio r (2,2). The ranking mechanism used for first aggregated table 900 can be used to rank/order third ordered near-neighbor 6 GHz radios table 910.

Figure 10:
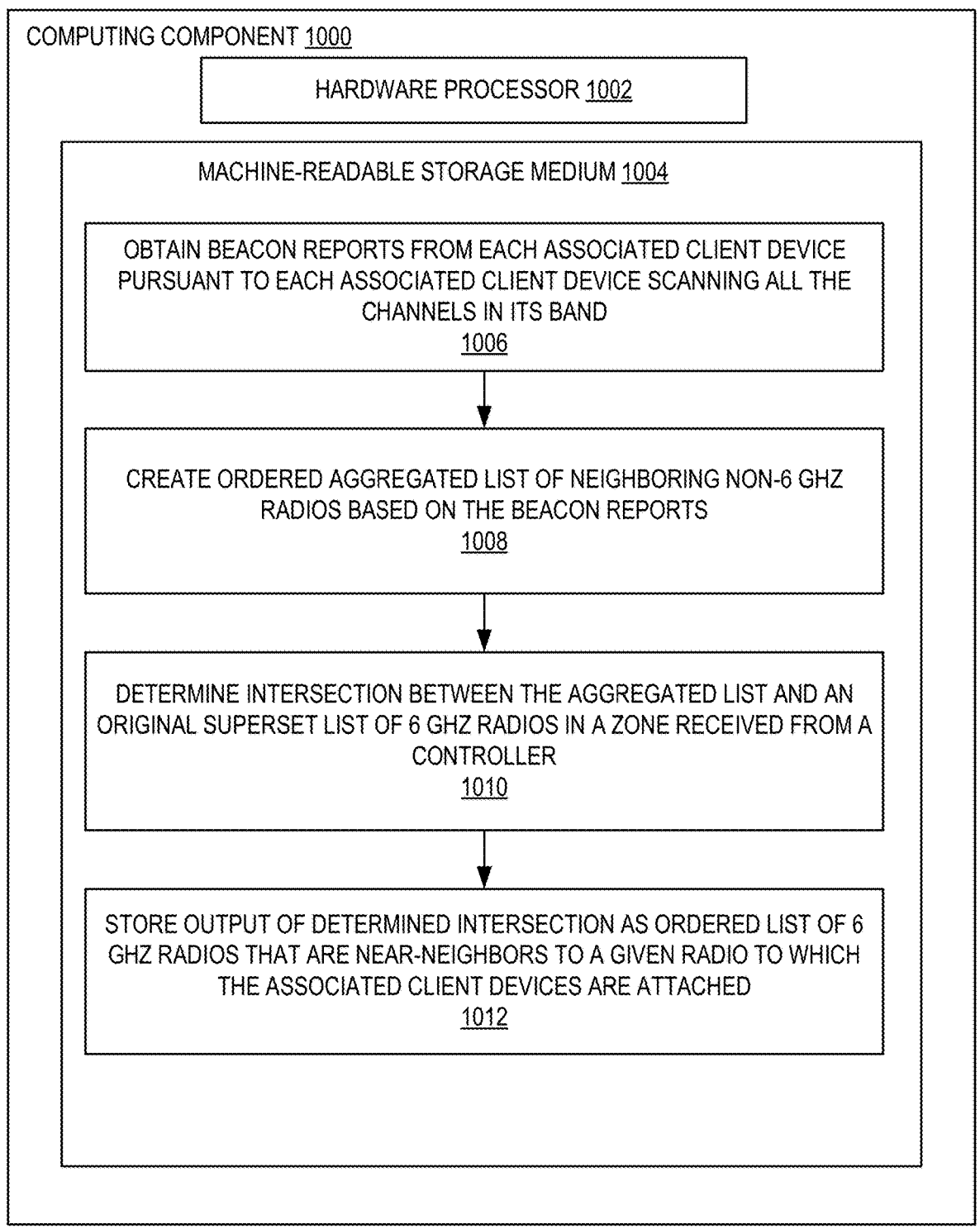
FIG. 10 is an example computing component that may be used to identify non-6 GHz radios collocated with 6 GHz radios that client devices of a given non-6 GHz radio can consider a near-neighbor.

FIG. 10 is a block diagram of an example computing component or device 1000, such as a controller, or an AP processor in accordance with one embodiment. Computing component 1000 may be, for example, a computing component capable of processing data. In the example implementation of FIG. 10, the computing component 1000 includes a hardware processor, 1002, and machine-readable storage medium, 1004, similar to computing component 500, hardware processor 502, and machine-readable storage medium 504. Machine-readable storage medium 1004 may be encoded with executable instructions, for example, instructions 1006-1014. In some embodiments, computing component 1000 may be an embodiment of controller 104 (or computing component thereof) (FIG. 1), processor 210 (FIG. 2B). etc.

Hardware processor 1002 may execute instruction 1006 obtain beacon reports from each associated client device pursuant to each associated client device scanning all the channels in its band. As noted above, each non-6 GHz radio in a zone may obtain beacon reports from the client devices associated to that non-6 GHz radio to ascertain strength and frequency of detected RSSI associated with other non-6 GHz radios in the zone.

Hardware processor 1002 may execute instruction 1008 to create an ordered aggregated list of neighboring non-6 GHz radios based on the obtained beacon reports (e.g., first master table 900). The ordering of the neighboring non-6 GHz radios included in the aggregated list can be based on the aforementioned relative frequency and strength of client device-measured RSSI.

Hardware processor 1002 may execute instruction 1010 to determine the intersection between the aggregated list and an original superset list (e.g., superset table 310 (FIG. 3B) of 6 GHz radios in the zone received from a controller. The intersection determination can be made to identify those 6 GHz radios in the zone that are considered as being near-neighbors to the given radio from the perspective of client devices associated with the given radio. Again, client devices may be non-uniformly distributed in the zone relative to APs/radios therein, and client devices may have different AP/radio preferences. This client device-based optimization may account for this non-uniformity and AP/radio preferences.

Hardware processor 1002 may execute instruction 1012 to store the output of the determined intersection as an ordered list of 6 GHz radios that are near-neighbors to the given radio to which the client devices are attached (as alluded to above). This ordered list may be a third near-neighbor 6 GHz radios ordered list that can be ranked from most frequent and strongest RSSI to least frequent and weakest RSSI. It should be noted that using the scan results from different client devices may result in some radios being scanned by many client devices with high RSSI, some by only a few client devices with high RSSI, some by many client devices with different RSSI values, etc. Accordingly, the frequency and strength of RSSI allows various embodiments to rank the aggregated list based on what is heard and how often.

iv. Identifying the Non-6 GHz Radios Collocated with 6 GHz Radios that can Consider the Clients of the Given Non-6 GHz Radio as a Near-Neighbor As will be described below, this approach of identifying non-6 GHz radios collocated with 6 GHz radios that can consider the client devices associated with a given non-6 GHz radio to be near-neighbors complements the above-described client device-based optimization approach. That is, instead of client devices of the given non-6 GHz radio scanning for non-6 GHz radios that are collocated with 6 GHz radios, an attempt to identify APs that can scan these client devices associated with the given radio is made. This optimization approach seeks to identify all the collocated non-6 GHz radios in a zone, and that are able to scan the associated client devices of a given non-6 GHz radio in the zone. This will allow the given non-6 GHz radio to be identified as the near-neighbor of the scanning AP's 6 GHz radio based on the view of the channel derived from the other APs based on client devices' transmissions. This optimization approach can be considered to be similar to the above-described optimization approach (ii) directed to identifying the non-6 GHz radios collocated with 6 GHz radios that can consider the given non-6 GHz radio as a near-neighbor. The difference between the two approaches is that in accordance with the previous radio-based optimization, the scanned information is derived from the given radio in a zone, wherein this client device-based optimization approach, information can be derived from the client devices associated to a given non-6 GHz radio.

Certain WLANs may leverage an existing mechanism whereby APs' radios are able to scan the probe requests from all the client devices in its vicinity. Information from the APs' radios may be aggregated and sent up to a controller. This mechanism can be used for each non-6 GHz radio to collect the RSSI information for all possible client devices in a network. This is irrespective of whether the client devices happen to be associated to a reference AP or not. The RSSI/signal strength information may be passed to the controller at certain intervals, e.g., in the form of regular reports. The controller may collate these reports from these AP radios, and may create a second aggregated list or table that can be indexed by a hash of each relevant client device's MAC address. Each row in the second aggregated table includes the signal strength/RSSI, and other parameters for each of the radios that identified (via AP scanning) the particular client device. A subset of this table, called as the virtual beacon report, is passed down to each AP and includes the information of the clients associated to it—that is, the radios in the zone that discovered all or a subset of the clients. That is, a controller can convert the second aggregated table into a converted table indexed by the "scanned radios," which may have a row of client device MAC addresses (of which some client devices are associated to radio r (2,2)). Those "rows" may be taken by the controller and sent to radio r (2,2), i.e., the aforementioned virtual beacon report.

Figures 11A, 11B:
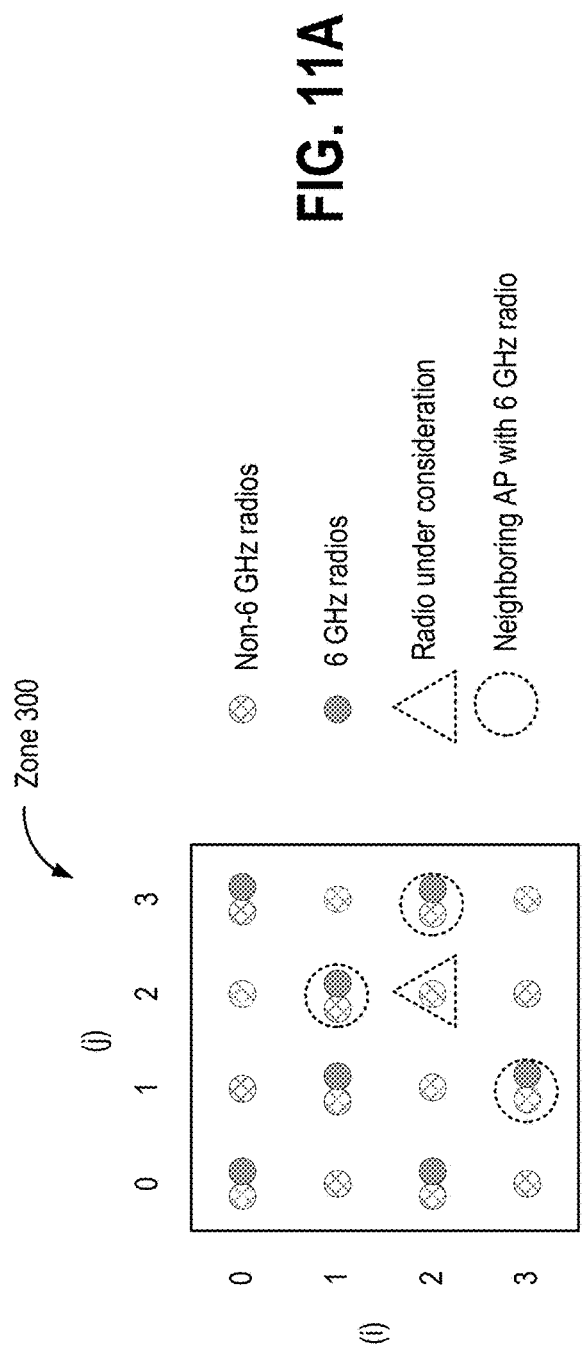
FIG. 11A illustrates an example scenario where APs scan for client devices of a given radio.
FIG. 11B illustrates generation of a fourth ordered near-neighbor 6 GHz radios list based on virtual beacon reporting.

As an example, FIG. 11A illustrates a scenario, where AP (2,2) has a non-collocated non-6 GHz radio r (2,2). Although not illustrated for clarity-sake, it should be understood that one or more client devices may be associated to AP (2,2), and may operate on, e.g., a channel provided by non-6 GHz radio r (2,2). As also illustrated in FIG. 11A, those APs that can identify the one or more client devices via scanning include, in this particular example, AP (1,2), AP (2,3), and AP (3,1), where the APs are those having non-6 GHz radios collocated with 6 GHz radios that can consider the identified/scanned client devices associated to AP (2,2) as being near-neighbors thereto.

FIG. 11B illustrates an aggregated virtual beacon reporting table 1100 reflecting all non-6 GHz radios in the zone 300 that, upon scanning, detect or identify one or more client devices attached to an AP on which a non-collocated non-6 GHz radio is operating. As illustrated in FIG. 11B, those non-6 GHz radios in zone 300 able to scan/detect client devices associated to AP (2,2) via information ascertained by radio r (2,2) include the following non-6 GHz radios: r (2,3); r (2,1); r (1,2); r (3,2); r (3,1). Again, radio r (2,2) may derive this information from virtual beacon reports received from other APs in the vicinity of AP (2,2) in which radio r (2,2) is implemented. The aggregated virtual beacon reporting table 1100 may be ranked, similar to the first aggregated table 900, in accordance with frequency and strength of RSSI measured by client devices.

As is done with first aggregated table 900, the radio may determine the intersection between aggregated virtual beacon reporting table 1100 and superset table 310 (FIG. 3B). This intersection determination can be performed to determine those of the identified non-6 GHz radios that are collocated with a 6 GHz radio. In this instance, those collocated non-6 GHz radios are radio r (2,3), radio r (1,2), and radio r (3,1). Thus, as illustrated in FIG. 11B, a resulting fourth ordered near-neighbor 6 GHz radios list or table 1110 includes the corresponding 6 GHz radios collocated with radio r (2,3), radio r (1,2), and radio r (3,1), which are 6 GHz radios R (2,3), R (1,2), and R (3,1). As can also be appreciated, fourth ordered near-neighbor 6 GHz radios table 1110 can be ordered based on the same ranking as done for aggregated virtual beacon reporting table 1100. Moreover, fourth ordered near-neighbor 6 GHz radios table 1110 may include the related radio metrics information associated with each of the identified 6 GHz radios that are considered to be near-neighbors to the given radio r (2,2).

Figure 12:
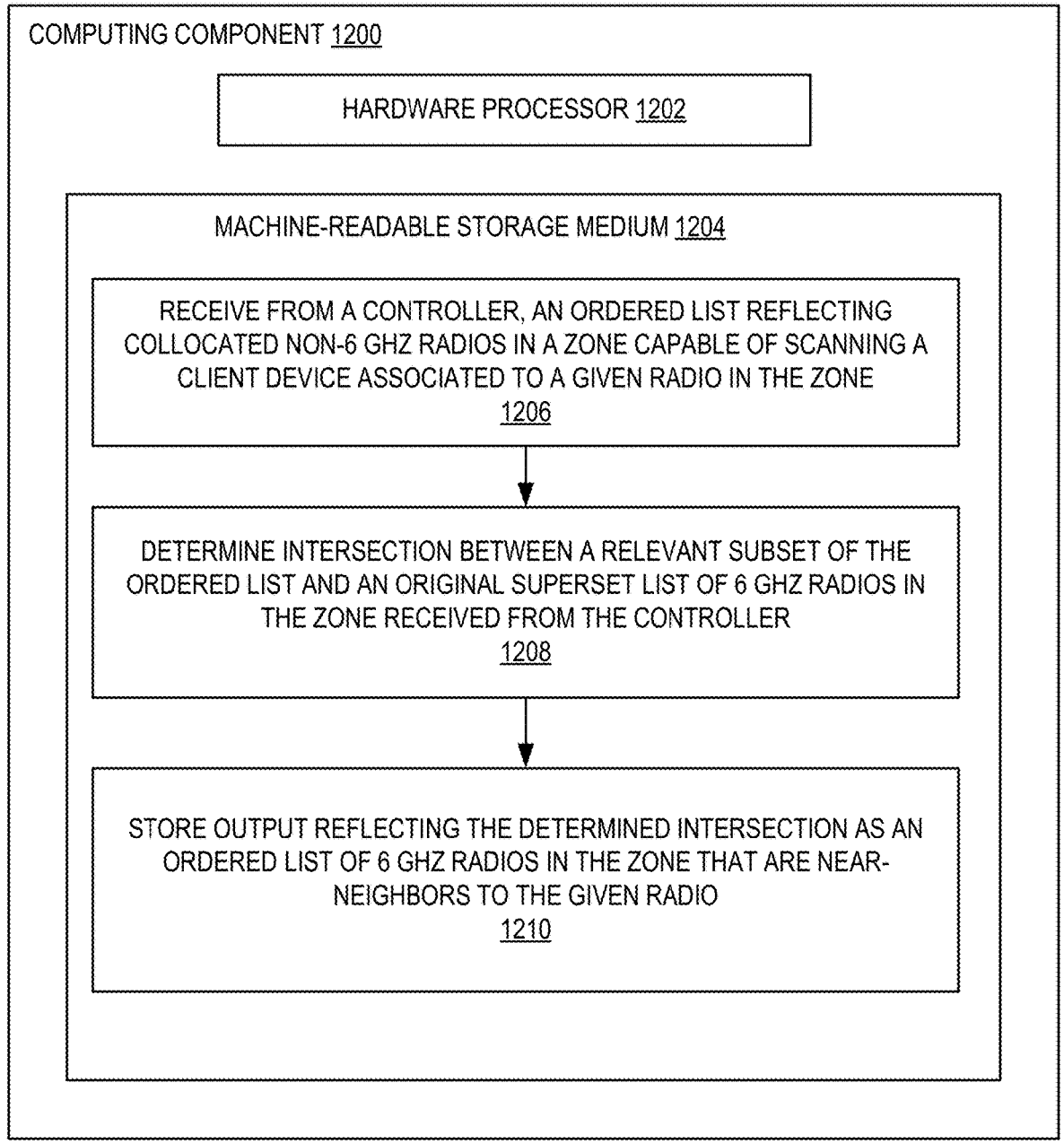
FIG. 12 is an example computing component that may be used to identify non-6 GHz radios collocated with 6 GHz radios that can consider the client devices of a given non-6 GHz radio a near-neighbor.

FIG. 12 is a block diagram of an example computing component or device 1200, such as an AP processor in accordance with one embodiment. Computing component 1200 may be, for example, a computing component capable of processing data. In the example implementation of FIG. 12, the computing component 1200 includes a hardware processor, 1202, and machine-readable storage medium, 1204, similar to, e.g., computing component 500, 800, or 1000, hardware processor 502, 802, 1002, and machine-readable storage medium 504, 804, 1004. Machine-readable storage medium 1204 may be encoded with executable instructions, for example, instructions 1206-1214. In some embodiments, computing component 1200 may be an embodiment of a controller, such as controller 104 (FIG. 1), an AP processor, such as processor 210 (FIG. 2B), etc.

Hardware processor 1202 may execute instruction 1206 to receive from a controller, an ordered list reflecting collocated non-6 GHz radios in a zone capable of scanning a client device associated with a given radio in a zone. It should be understood that each non-6 GHz radio collocated with a 6 GHz radio in the zone may scan all channels in its operating band to identify all client devices, whether or not connected to the non-6 GHz radio. Each of these non-6 GHz radios may share the scan results with a controller. As described above, the controller may collate or aggregate the scan results received from each of the collocated non-6 GHz radios, and generate an ordered list or table that is indexed by the scanned client devices. Each row may contain an ordered list (ordered by RSSI) of the non-6 GHz radios that scanned the client device in that row (index-client). The controller may further pass, to each non-6 GHz radio, a subset of the ordered list commensurate with the one or more client devices associated with each particular non-6 GHz radio, i.e., a "virtual" beacon report, along with a number of client devices for which it is reported. This can be converted into an ordered list of non-6 GHz radios such that the order can be based on associated RSSI frequency and RSSI strength.

Hardware processor 1202 may execute instruction 1208 to determine an intersection between the ordered list (relevant relative to the one or more client devices associated with a particular non-6 GHz radio), and an original superset list of 6 GHz radios in the zone. As described above, the intersection may identify those 6 GHz radios collocated with the non-6 GHz radios identified in the relevant ordered list, as those 6 GHz radios may be considered to be near-neighbor 6 GHz radios to the given radio.

Accordingly, hardware processor 1202 may execute instruction to store an output reflecting the determined intersection as an ordered list of 6 GHz radios in the zone that are near-neighbors to the given radio. Again, the order may be defined in terms of RSSI frequency and RSSI strength measured from the perspective of the one more clients associated with the given radio.

It should be understood that in some scenarios, it is possible that two non-6 GHz radios that have equivalent RSSIs (as determined in accordance with one or more of the aforementioned optimization approached) can have different RSSIs for a corresponding collocated 6 GHz radio because the 6 GHz radios may have a different transmission power. In such a scenario, various embodiments may weigh the measured RSSIs differently, e.g., based on a ratio of the power of a 6 GHz radio to the power of non-6 GHz radio). These weighted RSSIs normalize the non-6 GHz radios and 6 GHz radios power difference, and may be used as the measure against which the radios are ordered.

III. Combining Ordered Near-Neighbor 6 GHz Radios Lists for the Given Non-6 GHz Radio As discussed above, the asymmetric nature of wireless links, client device preferences, etc. can lead to differing information regarding the characteristic(s)/state(s) of a radio depending on how/from what perspective information regarding or associated with a radio is obtained. Moreover, scanning can be thought of as a best-effort process that can be limited by the duration of a scanning process, channel conditions, probability of detecting frames, and so on. Accordingly, the four aforementioned optimization approaches allow ordered or ranked lists of neighboring 6 GHz radios that can accurately (or as accurately as possible) be considered nearest to a given non-6 GHz radio to be determined. It should be understood that each of the above-described optimization approaches for determining near-neighbor 6 GHz radios can be repeated for every non-6 GHz radio in a given zone. The end result comprises four different ranked lists of 6 GHz radios that are nearest to a given AP/radio, relative to each non-6 GHz radio in the zone.

Figure 13:
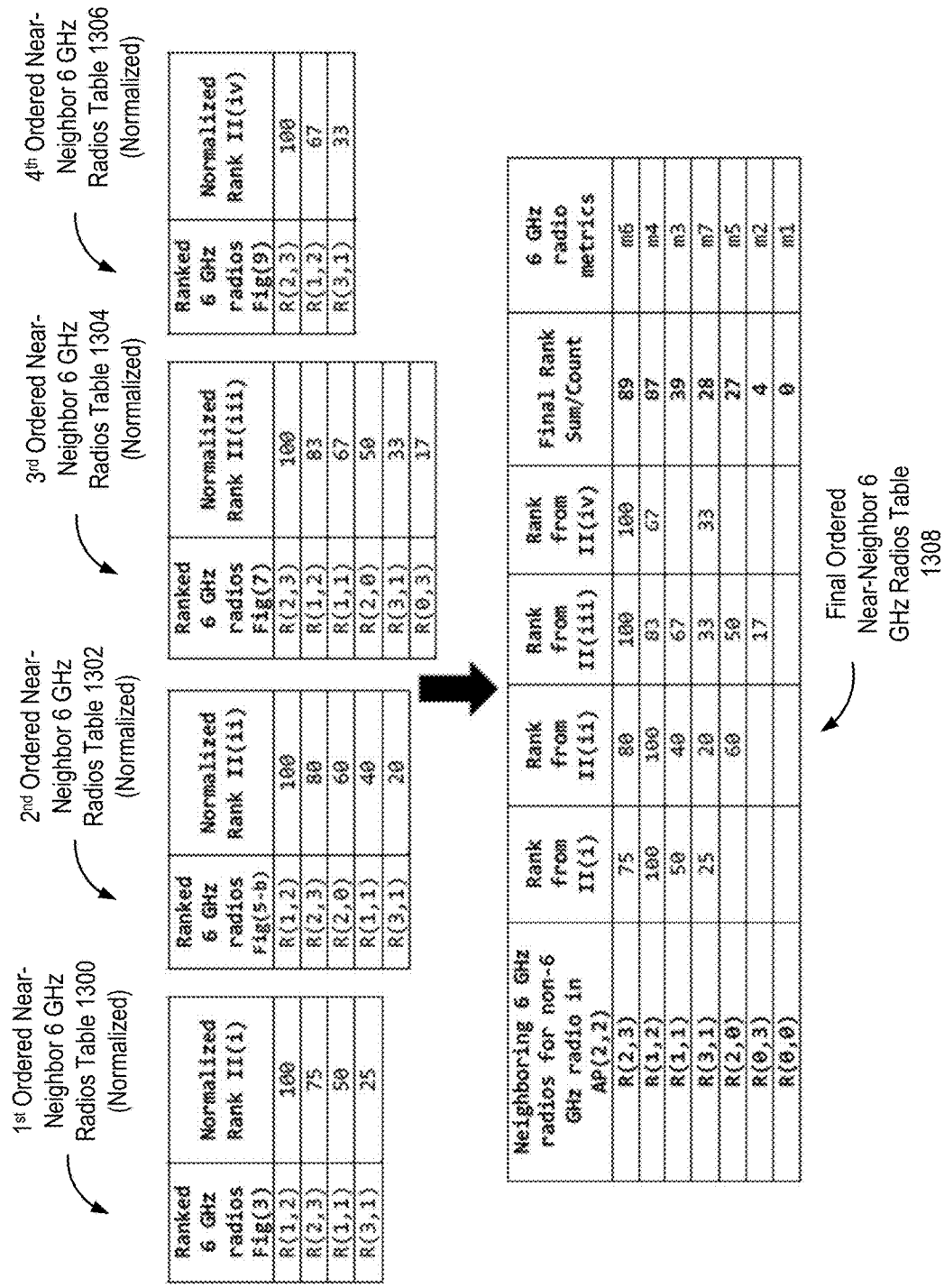
FIG. 13 illustrates an example of generating a final ordered near-neighbor 6 GHz radios list based on previously determined first through fourth ordered near-neighbor 6 GHz radios lists post-normalization.

In some embodiments, each near-neighbor 6 GHz radio identified or reflected in a near-neighbor 6 GHz radios table or list may have its ranking normalized or weighted. For example, each identified 6 GHz radio in a particular ordered near-neighbor 6 GHz radios list or table may be assigned relative to its originally-established ranking (per RSSI strength and reporting frequency) and depending on how many 6 GHz radios were identified in a particular list. FIG. 13 illustrates a set of four ordered near-neighbor 6 GHz radios tables (where the given radio is r (2,2), following the above examples). A first ordered near-neighbor 6 GHz radios table 1300 may have four identified 6 GHz radios, i.e., R (1,2), R (2,3), R (1,1), R (3,1). Although one of ordinary skill in the art could apply various normalization or weighting techniques, in this particular example, as described above, each 6 GHz radio may be assigned some value between 0 to 100 depending on the number of 6 GHz radios are present in the list. In first ordered near-neighbor 6 GHz radios table 1300, four 6 GHz radios appear, and so the normalized rank equates to R (1,2) having a rank of 100, R (2,3) having a rank of 75, R (1,1) having a rank of 50, and R (3,1) having a rank of 25, the numerical rank value. Normalized rankings in the second ordered near-neighbor 6 GHz radios list 1302 may be distributed per the five identified 6 GHz radios, resulting in valued rankings equaling 100, 80, 60, 40, and 20 (multiples of five). The same weighting or normalization can be applied to each of the 6 GHz radios appearing in the third and fourth ordered 6 GHz radios tables 1304 and 1306, respectively.

As also illustrated in FIG. 13, each set of ordered near-neighbor 6 GHz radios lists or tables can be combined into a final ordered near-neighbor 6 GHz radios list, e.g., list 1308. In accordance with the particular normalization scheme described above, in some embodiments, a final normalized rank may be assigned to each 6 GHz radio identified in each of the ordered near-neighbor 6 GHz radios lists. For example, the average ranking for each 6 GHz radio may be determined (for those radios appearing multiple times in the set of ordered near-neighbor 6 GHz radios lists), e.g., radio R (2,3) may have normalized ranks of 75, 80, 100, and 100. The average or mean ranking assigned to radio R (2,3) in the final ordered near-neighbor 6 GHz radios table 1308 may then be 89 (75+80+100+100/4=88.75). If a particular radio does not appear (was not identified in a particular ordered near-neighbor 6 GHz radios list), that radio may be assigned a normalized weight/rank of 0. Again, it should be understood that final ordered near-neighbor 6 GHz radios table, e.g., table 1308, is only one of a plurality of tables/lists (relative to one given radio, in this case, r (2,2) that may be generated or derived. Thus, each non-6 GHz radio in a zone will have an associated final near-neighbor 6 GHz radios list reflecting those 6 GHz radios that may be advertised in a particular non-6 GHz radio's RNR IE, where the non-6 GHz radio need not necessarily be physically collocated with a 6 GHz radio (in contrast to the 802.11ax standard). It should be noted that averaging rank is only one approach. In other embodiments, weighted schemes that prefer the results/utilization of one or more of the aforementioned optimization approaches (i-iv) may be used.

IV. Determining the 6 GHz Radio that can be Advertised in the RNR IE of the Given Non-6 GHz Radio As noted above, final ordered near-neighbor 6 GHz radios table 1308 provides a given non-6 GHz radio in the RF zone, and a list of the most preferable 6 GHz radio/s that the non-6 GHz radio may advertise. This final ordered near-neighbor 6 GHz radios table or list has been derived using the visibility between these radios and their corresponding client devices. However, the 6 GHz radio metrics corresponding to these radios may not necessarily be in the order of their ranking. For example, regarding radio R (2,3), it may have the highest normalized rank, but its radio metrics (referenced as m6) is only the second highest of the other radio metrics.

In some embodiments, the radios that may be chosen to be advertised may first be chosen based on its ability to meet the near-neighbor criteria from the final ordered near-neighbor 6 GHz radios table. For example, if the criteria are for the rank to be greater than 50, only radios R(2,3) (having a radio metric of m6) and R(1,2) (having a radio metric of m4) will qualify, and be considered as the most preferable radios. However, these two radios may have different utilizations, and thus, in various embodiments, the threshold for a final normalized ranking determination regarding which 6 GHz radios can be considered as near-neighbors may be dependent on a particular implementation. Utilization as used herein, can refer to the radio metric information/values. That is, even though non-6 GHz radio R(2,3) ranks higher than R(1,2), it may still be desirable to advertise R(2,3) on r(2,2) as will as R(1,2).

In accordance with some embodiments, a goal may be to maximize the radio metrics for the 6 GHz radios that are deemed as being the closest near-neighbors to the given non-6 GHz radio. To achieve this, the advertising RNR IE may include information of the 6 GHz radio with the lower radio metric within this subset. This will provide the benefit of load balancing between the 6 GHz radios as client devices connect to them directly. This also minimizes the need for client device steering at a later point in time. Thus, if radio metric m4 is less than radio metric m6, in accordance with various embodiments, the radio metric information of 6 GHz radio R(1,2) may be included in the RNR IEs of the non-6 GHz radio r(2,2) on AP(2,2) until the radio metric information gets updated and the metrics or the neighborhood rankings change.

In cases, where there are more than one neighboring 6 GHz radios with similar radio-metrics, the selection of radios for populating the RNR IE (to be advertised) can alternate between those neighboring 6 GHz radios having similar radio-metrics. This may enable a network to maintain a balanced load between the 6 GHz radios. Thus, if radio metrics m4 and m6 are equivalent, the radio metrics information of R(1,2) and R(2,3) are alternatingly included in the RNR IEs of the non-6 GHz radio r(2,2) on AP(2,2) until the information gets updated and the metrics or the neighborhood rankings change.

FIG. 14 is a block diagram of an example computing component or device 1400, such as an AP processor, e.g., processor 210 (FIG. 2B) or controller 104 in accordance with one embodiment. Computing component 1400 may be, for example, a computing component capable of processing data. In the example implementation of FIG. 14, the computing component 1400 includes a hardware processor, 1402, and machine-readable storage medium, 1404, similar to, e.g., computing component 500, 800, or 1000, hardware processor 502, 802, 1002, and machine-readable storage medium 504, 804, 1004. Machine-readable storage medium 1404 may be encoded with executable instructions, for example, instructions 1406-1412.

Hardware processor 1402 may execute instruction 1406 to receive, at a non-6 GHz radio in a zone, collated 6 GHz radio metrics broadcast from a controller, the radio metrics being collected by each 6 GHz radio in the zone. As described above, in accordance with some embodiments, an initial operation that will ultimately lead to the advertisement of 6 GHz radios by non-6 GHz radios can include defining a metric describing the state of a given 6 GHz radio in a zone. That metric provides a way by which radios can be compared against one another, i.e., the metric can be used to qualify and compare the 6 GHz radio against another 6 GHz radio. This metric can be calculated by the 6 GHz radio across all its BSSs.

Hardware processor 1402 may execute instruction 1408 to identify neighboring 6 GHz radios for each of the non-6 GHz radios in the zone in accordance with each of a plurality of near-neighbor optimization mechanisms. As noted above, a summary of all the 6 GHz radios (that are implemented as part of one or more APs) in a zone of a mixed AP deployment, along with their corresponding radio metrics information, and their associated collocated non-6 GHz radio can be provided to a controller, which can then disseminate the summary (e.g., a superset list) to each non-6 GHz radio in the zone. Once every non-6 GHz radio in the zone obtains or is provided with a copy of the superset list of 6 GHz radios, a subset of the 6 GHz radios that are "near-neighbors" of (closest to) a given non-6 GHz radio can ultimately be determined.

Hardware processor 1402 may execute instruction 1410 to combine ordered lists of near-neighbor 6 GHz radios for the non-6 GHz radio, the non-6 GHz radio comprising a given radio under consideration. As described above, a first optimization approach may be to identify the non-6 GHz radios collocated with 6 GHz radios that a given non-6 GHz radio can consider a near-neighbor. A second optimization approach may be complementary to the first optimization approach, wherein the non-6 GHz radios collocated with 6 GHz radios in the zone that can consider the given non-6 GHz radio a near-neighbor can be identified. A third optimization approach may identify those non-6 GHz radios collocated with 6 GHz radios that client devices of the given non-6 GHz radio can consider a near-neighbor. A fourth optimization approach can involve, as a complement to the third optimization, identifying the non-6 GHz radios collocated with 6 GHz radios that consider the client devices of the given non-6 GHz radio a near-neighbor.

Hardware processor 1402 may execute instruction 1412 to determine a 6 GHz radio that can be advertised by the non-6 GHz radio. Again, each set of ordered near-neighbor 6 GHz radios lists or tables created in accordance with each of the four optimization approaches for each non-6 GHz radio in a zone can be normalized and combined to determine those 6 GHz radios that should be preferably advertised by each non-6 GHz radio.

It should be understood that advertising 6 GHz radios in the disclosed manner can provide a valuable improvement to conventional WLAN systems, because client devices would be willing to move to 6 GHz channels whenever possible in order to use the cleaner, under-utilized and wider channels in that band. With the higher costs of designing tri-radio APs, various embodiments will also allow non-6 GHz (dual-band) APs to participate in 6 GHz out-of-band discovery and add value in a 6 GHz load optimization.

Figure 15:
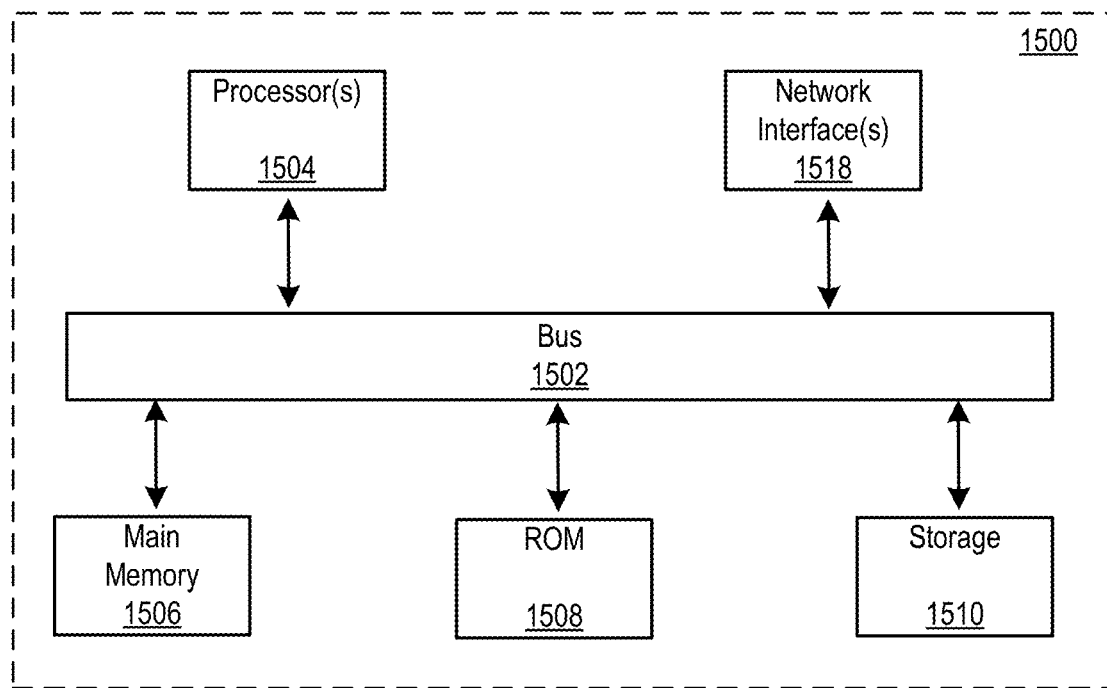
FIG. 15 is an example computing component that may be used to implement various features of embodiments of the present disclosure.

FIG. 15 depicts a block diagram of an example computer system 1500 in which various of the embodiments described herein may be implemented. The computer system 1500 includes a bus 1502 or other communication mechanism for communicating information, one or more hardware processors 1504 coupled with bus 1502 for processing information. Hardware processor(s) 1504 may be, for example, one or more general purpose microprocessors.

The computer system 1500 also includes a main memory 1506, such as a random access memory (RAM), cache and/or other dynamic storage devices, coupled to bus 1502 for storing information and instructions to be executed by processor 1504. Main memory 1506 also may be used for storing temporary variables or other intermediate information during execution of instructions to be executed by processor 1504. Such instructions, when stored in storage media accessible to processor 1504, render computer system 1500 into a special-purpose machine that is customized to perform the operations specified in the instructions.

The computer system 1500 further includes a read only memory (ROM) 1508 or other static storage device coupled to bus 1502 for storing static information and instructions for processor 1504. A storage device 1510, such as a magnetic disk, optical disk, or USB thumb drive (Flash drive), etc., is provided and coupled to bus 1502 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor(s) 1504 executing one or more sequences of one or more instructions contained in main memory 1506. Such instructions may be read into main memory 1506 from another storage medium, such as storage device 1510. Execution of the sequences of instructions contained in main memory 1506 causes processor(s) 1504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1510. Volatile media includes dynamic memory, such as main memory 1506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1502. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for identifying near-neighbor non-6 GHz radios in a radio frequency (RF) zone of a wireless local area network (WLAN) through which one or more of the 6 GHz radios in the WLAN may be advertised for out-of-band discovery, the method comprising:
- identifying a first set of non-6 GHz radios collocated with a first set of 6 GHz radios that a given non-6 GHz radio considers to be near-neighbors;
- identifying a second set of non-6 GHz radios collocated with a second set of 6 GHz radios that consider the given non-6 GHz radio to be a near-neighbor;
- identifying a third set of non-6 GHz radios collocated with a third set of 6 GHz radios that client devices of the given non-6 GHz radio consider to be near-neighbors;
- identifying a fourth set of non-6 GHz radios collocated with a fourth set of 6 GHz radios that consider client devices of the given non-6 GHz radio to be near-neighbors;
- based on the identifying of the first, second, third, and fourth sets of non-6 GHz radios, creating, by an access point (AP) controller in the WLAN, an ordered near-neighbor 6 GHz radios list ranking 6 GHz radios in the RF zone for the given non-6 GHz radio: and
- disseminating, by the AP controller, the ordered near-neighbor 6 GHz radios list to the given non-6 GHz radio.

2. The method of claim 1, wherein the first, second, third, and fourth sets of non-6 Hz radios comprise respective subsets of all the non-6 GHz radios in the RF zone.

3. The method of claim 1, wherein the first, second, third, and fourth sets of 6 GHz radios comprise respective subsets of all the 6 GHz radios in the RF zone.

4. The method of claim 1, wherein identifying the first set of non-6 GHz radios collocated with the first set of 6 GHz radios that the given non-6 GHz radio considers to be near-neighbors comprises scanning, by an AP including the given non-6 GHz radio, all channels in its operating band.

5. The method of claim 4, further comprising creating a scanned radios list of discovered non-6 GHz radios ordered by signal strength.

6. The method of claim 5, further comprising determining an intersection between the scanned radios list and a 6 GHz radio superset list.

7. The method of claim 6, further comprising storing an output of the intersection determination as a first ordered near-neighbor 6 GHz radios list, the first ordered near-neighbor 6 GHz radios list comprising the first set of 6 GHz radios.

8. The method of claim 1, wherein identifying the second set of non-6 GHz radios collocated with the second set of 6 Ghz radios that consider the given non-6 GHz radio to be a near-neighbor comprises deriving an ordered complementary list indexed by scanned radios.

9. The method of claim 8, wherein the ordered complementary list indicates scanning radios that scanned one of the indexed scanned radios.

10. The method of claim 9, further comprising determining an intersection between a given of the indexed scanned radios and the original superset of 6 GHz radios.

11. The method of claim 1, wherein the first, second, third, and fourth sets of non-6 GHz radios are one of physically or logically collocated with respective first, second, third, and fourth sets of 6 GHz radios.

12. The method of claim 1, wherein identifying the third set of non-6 GHz radios physically collocated with the third set of 6 GHz radios that client devices of the given non-6 GHz radio consider to be near-neighbors comprises obtaining beacon reports from each client device associated to an AP including the given non-6 GHz radio, each client device scanning all channels in a respective operating band.

13. The method of claim 12, further comprising creating an ordered aggregated list of neighboring non-6 GHz radios based on the beacon report.

14. The method of claim 13, further comprising determining an intersection between the ordered aggregated list and an original superset of 6 GHz radios in the RF zone.

15. The method of claim 14, further comprising storing an output of the determined intersection as an ordered list of 6 GHz radios that are determined near-neighbors to the given non-6 GHz radio, the ordered list of 6 GHz radios comprising the third set of 6 GHz radios.

16. The method of claim 1, wherein identifying the fourth set of non-6 GHz radios physically collocated with the fourth set of 6 GHz radios that consider client devices of the given non-6 GHz radio to be near-neighbors comprises receiving, at an AP including the given non-6 GHz radio, an ordered list reflecting collocated non-6 GHz radios in the RF zone capable of scanning a client device associated to the given non-6 GHz radio.

17. The method of claim 16, further comprising determining an intersection between a relevant subset of the ordered list and an original superset of 6 GHz radios in the RF zone.

18. The method of claim 17, further comprising storing an output reflecting the determined intersection as an ordered list of 6 GHz radios in the RF zone that are near-neighbors to the given non-6 GHz radio, the ordered list of 6 GHz radios comprising the fourth set of 6 GHz radios.

19. The method of claim 1, further comprising repeating the identification of the first, second, third, and fourth sets of non-6 GHz radios from respective perspectives of all other non-6 GHz radios in the RF zone.

20. An access point (AP) operating in a wireless local area network (WLAN), comprising:
- a first non-6 GHz radio, wherein the AP does not include a 6 GHz radio;
- a processor; and
- a memory unit including computer code that when executed causes the processor to execute a method of identifying near-neighbor non-6 GHz radios in a radio frequency (RF) zone of the WLAN through which one or more of the 6 GHz radios in the WLAN may be advertised for out-of-band discovery, the method comprising:
  - identifying a first set of non-6 GHz radios collocated with a first set of 6 GHz radios that the first non-6 GHz radio considers to be near-neighbors;
  - identifying a second set of non-6 GHz radios collocated with a second set of 6 GHz radios that consider the first non-6 GHz radio to be a near-neighbor;
  - identifying a third set of non-6 GHz radios collocated with a third set of 6 GHz radios that client devices of the first non-6 GHz radio consider to be near-neighbors;
  - identifying a fourth set of non-6 GHz radios collocated with a fourth set of 6 GHz radios that consider client devices of the first non-6 GHz radio to be near-neighbors;
  - based on the identifying of the first, second, third, and fourth sets of non-6 GHz radios, creating an ordered near-neighbor 6 GHz radios list ranking 6 GHz radios in the RF zone for the first non-6 GHz radio; and
  - advertising (disseminating), in accordance with the ordered near-neighbor 6 GHz radios list, a 6 GHz radio in the RF zone in at least one of a discovery beacon and probe response of the first non-6 GHz radio.

\* \* \* \* \*